United States Patent
Gonda et al.

(10) Patent No.: US 10,686,177 B2
(45) Date of Patent: Jun. 16, 2020

(54) ELECTRODE CARTRIDGE AND ZINC SECONDARY CELL USING SAME

(71) Applicant: NGK INSULATORS, LTD., Nagoya (JP)

(72) Inventors: Yuichi Gonda, Nagoya (JP); Naohito Yamada, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 12 days.

(21) Appl. No.: 15/964,201

(22) Filed: Apr. 27, 2018

(65) Prior Publication Data

US 2018/0248165 A1    Aug. 30, 2018

Related U.S. Application Data

(63) Continuation of application No. PCT/JP2016/083734, filed on Nov. 14, 2016.

(30) Foreign Application Priority Data

Nov. 16, 2015 (JP) ................................. 2015-223800

(51) Int. Cl.
*H01M 2/00* (2006.01)
*H01M 2/16* (2006.01)
(Continued)

(52) U.S. Cl.
CPC ....... *H01M 2/1686* (2013.01); *H01M 2/1646* (2013.01); *H01M 4/244* (2013.01);
(Continued)

(58) Field of Classification Search
CPC ............... H01M 2/145; H01M 2/1686; H01M 2300/0085; H01M 4/32; H01M 4/74; H01M 10/34; H01M 4/244

See application file for complete search history.

(56) References Cited

U.S. PATENT DOCUMENTS

| 2011/0003185 A1* | 1/2011 | Kritzer | F16J 15/064 |
| | | | 429/56 |
| 2011/0189518 A1* | 8/2011 | Fujita | H01M 10/0431 |
| | | | 429/94 |

(Continued)

FOREIGN PATENT DOCUMENTS

| JP | 2000-067842 A1 | 3/2000 |
| WO | 2013/118561 A1 | 8/2013 |

(Continued)

OTHER PUBLICATIONS

International Search Report and Written Opinion (Application No. PCT/JP2016/083734) dated Feb. 14, 2017 (with English translation).

*Primary Examiner* — Cynthia H Kelly
*Assistant Examiner* — Monique M Wills
(74) *Attorney, Agent, or Firm* — Burr & Brown, PLLC

(57) ABSTRACT

There is disclosed an electrode cartridge for use in a hermetic zinc secondary battery comprising a separator structure including a separator exhibiting hydroxide ion conductivity and water impermeability; a counter member liquid-tightly sealed to the separator structure so as to form an internal space and constituting an open-top water impermeable case together with the separator structure; and an electrode that is accommodated in the internal space of the water impermeable case and is a negative electrode containing zinc and/or zinc oxide or a positive electrode. According to the present invention, there is provided an electrode built-in component that can reliably isolate the positive and negative electrodes from each other with a hydroxide ion conductive separator, in the form of an electrode cartridge that is easy to handle and manufacture and that is more advantageous for assembling a stacked-cell battery, while reducing the number of sealing joints.

24 Claims, 18 Drawing Sheets

(51) Int. Cl.
*H01M 10/34* (2006.01)
*H01M 10/28* (2006.01)
*H01M 4/24* (2006.01)
*H01M 4/32* (2006.01)
*H01M 4/74* (2006.01)
*H01M 2/14* (2006.01)

(52) U.S. Cl.
CPC ......... *H01M 10/28* (2013.01); *H01M 10/288* (2013.01); *H01M 10/34* (2013.01); *H01M 2/145* (2013.01); *H01M 4/32* (2013.01); *H01M 4/74* (2013.01); *H01M 2300/0085* (2013.01)

(56) References Cited

U.S. PATENT DOCUMENTS

| | | | |
|---|---|---|---|
| 2013/0273442 A1* | 10/2013 | Ogumi | H01M 4/9016 429/405 |
| 2013/0288153 A1* | 10/2013 | Yang | H01M 8/1004 429/482 |
| 2014/0315099 A1 | 10/2014 | Yamada et al. | |
| 2016/0141582 A1 | 5/2016 | Fujisaki et al. | |
| 2016/0226049 A1 | 8/2016 | Hashimoto et al. | |
| 2018/0083246 A1 | 3/2018 | Gonda et al. | |

FOREIGN PATENT DOCUMENTS

| | | |
|---|---|---|
| WO | 2015/098610 A1 | 7/2015 |
| WO | 2016/039349 A1 | 3/2016 |
| WO | 2016/204050 A1 | 12/2016 |
| WO | 2017/002815 A1 | 1/2017 |

* cited by examiner

ELECTRODE CARTRIDGE AND ZINC SECONDARY CELL USING SAME

CROSS-REFERENCE TO RELATED APPLICATIONS

This application is a continuation application of PCT/JP2016/083734 filed Nov. 14, 2016, which claims priority to Japanese Patent Application No. 2015-223800 filed Nov. 16, 2015, the entire contents all of which are incorporated herein by reference.

BACKGROUND OF THE INVENTION

1. Field of the Invention

The present invention relates to an electrode cartridge and a zinc secondary battery using the electrode cartridge.

2. Description of the Related Art

Zinc secondary batteries, such as nickel-zinc secondary batteries, have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. Thus, a strong demand has arisen for a technique for preventing the short circuit caused by dendritic zinc in zinc secondary batteries, such as nickel-zinc secondary batteries.

In order to meet such a demand, batteries including hydroxide-ion-conductive ceramic separators have been proposed. For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is a layered double hydroxide (LDH) having a basic composition represented by the formula: $M^{2+}_{1-x}M^{3+}_x(OH)_2A^{n-}_{x/n}\cdot mH_2O$ (wherein $M^{2+}$ represents at least one type of divalent cation, $M^{3+}$ represents at least one type of trivalent cation, $A^{n-}$ represents an n-valent anion, n is an integer of 1 or more, and x is 0.1 to 0.4). Furthermore, Patent Document 2 (WO2015/098610) discloses a layered double hydroxide (LDH)-containing composite material including a porous substance and a LDH-containing functional layer. The functional layer exhibits water impermeability.

A stacked-cell battery composed of a plurality of cells is widely known for achieving output of high voltage and high current. A stacked-cell battery has a structure of a laminate composed of a plurality of cells connected in series or parallel and disposed in a single battery container.

CITATION LIST

Patent Documents

Patent Document 1: WO2013/118561
Patent Document 2: WO2015/098610

SUMMARY OF THE INVENTION

The present applicant has already successfully developed a highly-densified ceramic separator (inorganic solid electrolyte separator) exhibiting hydroxide ion conductivity and water impermeability. The present applicant has also successfully formed such a ceramic separator on a porous substrate. The use of such a separator (or a separator provided with a porous substrate) in a secondary battery, such as a zinc-nickel battery, can prevent the short circuit caused by dendritic zinc. The maximization of such an effect requires reliable separation of the positive electrode side from the negative electrode side by a hydroxide-ion-conductive ceramic separator in a battery container. If a stacked-cell battery having such a configuration could be readily assembled from a plurality of cells, high voltage and high current could be readily achieved, which is very advantageous. The construction of a hermetic nickel-zinc battery, however, requires to ensure a desired liquid tightness while the positive electrode side and the negative electrode side are reliably separated. Sealing of the joints, therefore, must be ensured, which may lead to a complicated battery configuration and manufacturing process. The complexity of such battery configurations and manufacturing processes can be particularly pronounced when the stacked-cell battery is constructed. This is because it is required to seal each of the plurality of cells in the stacked-cell battery to ensure liquid tightness.

For addressing the above-described problem, the present applicant has successfully fabricated a laminate composed of cells each including a positive electrode and a negative electrode reliably isolated by a hydroxide ion conductive separator such that the laminate of cells of a nickel-zinc battery is accommodated in an open-top flexible bag made of a flexible film and a positive-electrode chamber and a negative-electrode chamber is defined by a separator structure including the hydroxide ion conductive separator. Thus, the laminate composed of cells can be provided in the form of a flexible cartridge (cell pack) that can be easy to handle and manufacture and that are significantly advantageous also in the assembly of stacked-cell batteries. Accommodation of a desired number of cartridges in a hermetic container allows for a significantly straightforward assembly of a hermetic nickel-zinc battery as a stacked-cell battery having a desired number of layers. In the stacked-cell battery of this configuration, however, the film may be damaged due to a process of hermetically joining a plurality of flexible films by, for example, thermal bonding. If the number of laminated films is large, an unsealed portion may be generated at the time of hermetically joining by, for example, thermal bonding, resulting in a low product yield. It is desirable for the battery to have an electrode built-in component having a structure with a minimum amount of sealing joints.

The present inventors have fabricated an open-top water impermeable case having a separator structure including a hydroxide ion conductive separator and a counter member and accommodated a positive electrode or a negative electrode for a zinc secondary battery in the case. As a result, the inventors have found that an electrode built-in component that can reliably isolate the positive and negative electrodes from each other with hydroxide ion conductive separator can be provided in the form of an electrode cartridge that is easy to handle and manufacture and that is more advantageous for assembling a stacked-cell battery, while the number of sealing joints are being reduced. Furthermore, the inventors also have found that a hermetic zinc secondary battery as a stacked-cell battery having a desired number of layers can be readily assembled by alternately disposing a desired number of electrode cartridges and counter electrodes in a hermetic container. In particular, a stacked-cell battery having a significantly simplified configuration that is significantly easy to manufacture can be provided because lamination of a plurality of flexible films is unnecessary and the accommodating section (for example, the positive electrode chamber) of the counter electrodes (for example, the positive electrodes) can be a common accommodating section that is not to be separated.

Accordingly, an object of the present invention is to provide an electrode built-in component that can reliably isolate the positive and negative electrodes from each other with a hydroxide ion conductive separator, in the form of an electrode cartridge that is easy to handle and manufacture and that is more advantageous for assembling a stacked-cell battery, while reducing the number of sealing joints. Another object of the present invention is to provide a hermetic zinc secondary battery that can be readily assembled into a stacked-cell battery having a desired number of layers.

According to one embodiment of the present invention, there is provided an electrode cartridge for use in a hermetic zinc secondary battery comprising:

a separator structure including a separator exhibiting hydroxide ion conductivity and water impermeability,
a counter member liquid-tightly sealed to the separator structure so as to form an internal space and constituting an open-top water impermeable case together with the separator structure, and
an electrode accommodated in the internal space of the water impermeable case and is a negative electrode containing zinc and/or zinc oxide or a positive electrode.

According to another embodiment of the present invention, there is provided a zinc secondary battery comprising:

a hermetic container,
one or more electrode cartridges accommodated with the top open in the hermetic container,
a first electrolytic solution containing an alkali metal hydroxide aqueous solution accommodated in the electrode cartridge, the electrode being disposed in the first electrolytic solution,
one or more counter electrodes facing the respective separator structures of the electrode cartridges, the counter electrodes being positive electrodes or negative electrodes comprising zinc and/or zinc oxide, and
a second electrolytic solution containing an alkali metal hydroxide aqueous solution accommodated in the hermetic container, the counter electrode being disposed in the second electrolytic solution,
wherein the first electrolytic solution and the second electrolytic solution are isolated from each other so as not to be in fluid communication with each other via the electrode cartridge.

DETAILED DESCRIPTION OF THE INVENTION

Electrode Cartridge and Zinc Secondary Battery

The present invention relates to an electrode cartridge used in a hermetic zinc secondary battery and a zinc secondary battery using the electrode cartridge. The zinc secondary battery referred to herein may be of any type to which a hydroxide-ion-conductive ceramic separator can be applied; for example, any alkaline zinc secondary battery, such as a nickel-zinc secondary battery, a silver oxide-zinc secondary battery, or a manganese oxide-zinc secondary battery. Particularly preferred is a nickel-zinc secondary battery. Although general explanations may be made below on the basis of a nickel-zinc secondary battery, which is a typical example, the separator structure of the present invention may be applied not only to the nickel-zinc secondary battery, but also to the aforementioned secondary battery to which the hydroxide-ion-conductive ceramic separator can be applied. The separator structure may be applied to a cell including one pair of positive and negative electrodes, or may be applied to a stacked-cell battery including two or more pairs of positive and negative electrodes; i.e., two or more cells. The stacked-cell battery may be a serially or parallelly stacked-cell battery.

Throughout the specification, the electrode cartridge refers to a battery built-in component that can be handled independently and accommodates an electrode for a zinc secondary battery (that is, a positive electrode or a negative electrode) in an open-top water-impermeable case. The electrode cartridge may be previously charged with an electrolytic solution. The electrode cartridge may be composed of a hard material (typically, a rigid material) as a whole, or at least a part or a most of it may be composed of a flexible material such as a flexible film. In any case, the electrode cartridge can be accommodated as a main component of the hermetic zinc secondary battery by accommodating the electrolytic solution in the hermetic container together with the counter electrode. Consequently, it is sufficient to secure the liquid tightness in a hermetic container to be finally accommodated, so that the electrode cartridge itself can be a simple open-top configuration. This open-top configuration can also avoid troubles, for example, overcharge of nickel-zinc batteries. In details, although overcharge of a nickel-zinc battery or the like may generate oxygen ($O_2$) at the positive electrode, the water-impermeable separator has such high density through which only hydroxide ions can substantially pass and thus $O_2$ cannot pass. In this respect, according to the open-top structure, $O_2$ can be released to the upper side of the positive electrode and sent to the negative electrode via the open-top portion of the electrode cartridge, so that the negative electrode can be oxidized with $O_2$ into ZnO. The open-top type electrode cartridge used in a hermetic zinc secondary battery can improve the overcharge tolerance through such an oxygen reaction cycle.

Figure 1A:
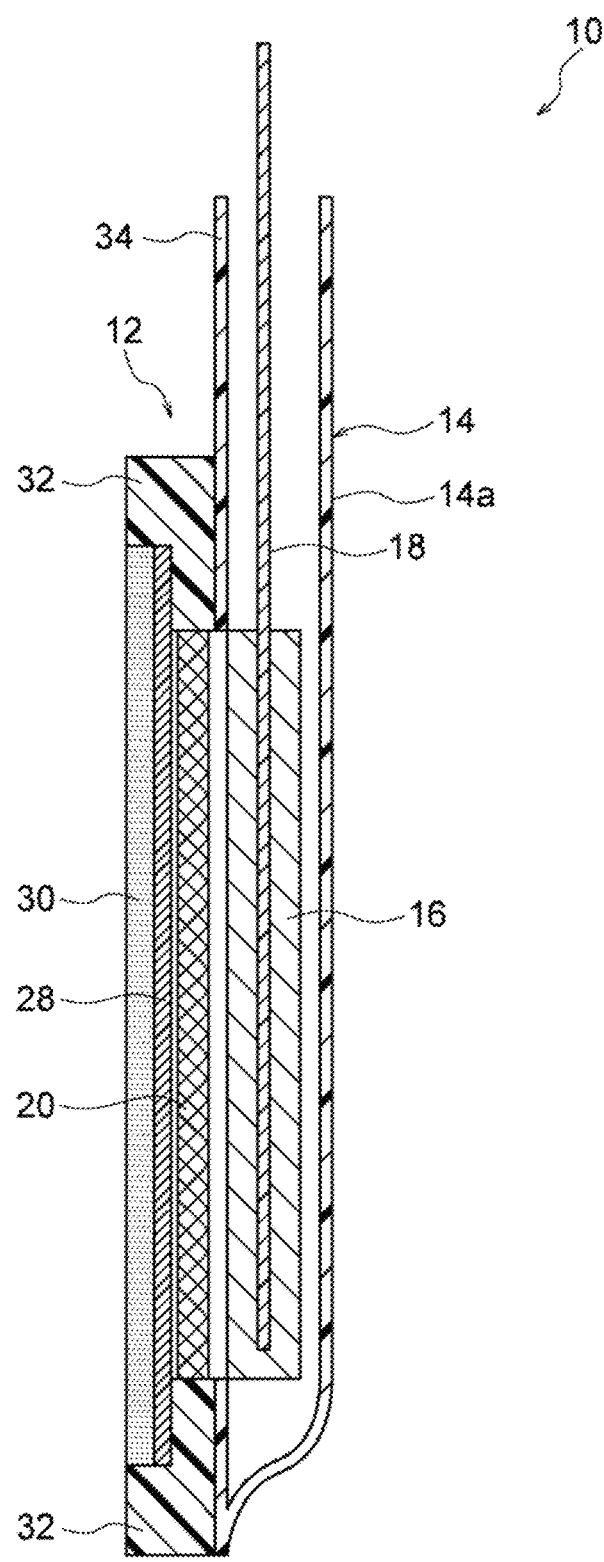
FIG. 1A is a schematic cross-sectional view of an electrode cartridge in an embodiment according to the present invention.

FIG. 1A shows an embodiment of an electrode cartridge according to the present invention. As shown in FIG. 1A, the electrode cartridge 10 includes a separator structure 12, a counter member 14 constituting an open-top water impermeable case together with the separator structure 12, and an electrode 16 accommodated in the inner space of the water-impermeable case. The separator structure 12 includes a separator 28 having hydroxide ion conductivity and water impermeability. The counter member 14 is liquid-tightly joined so as to form an internal space in the separator structure 12 and constitutes an open-top water impermeable case together with the separator structure 12. The electrode 16 may be either a negative electrode or a positive electrode. In the case where the electrode is a negative electrode, it is composed of zinc and/or zinc oxide. In the case where the electrode 16 is a positive electrode for a nickel-zinc secondary battery, it is composed of nickel hydroxide and/or nickel oxyhydroxide. Such a configuration can provide an electrode-built-in component including the hydroxide ion-conductive separator 28 that can reliably isolate the positive and negative electrodes from each other, in the form of an electrode cartridge 10 that is easy to handle and manufacture and that is more advantageous for assembling a stacked-cell battery, while reducing the number of sealing joints.

Figure 1B:
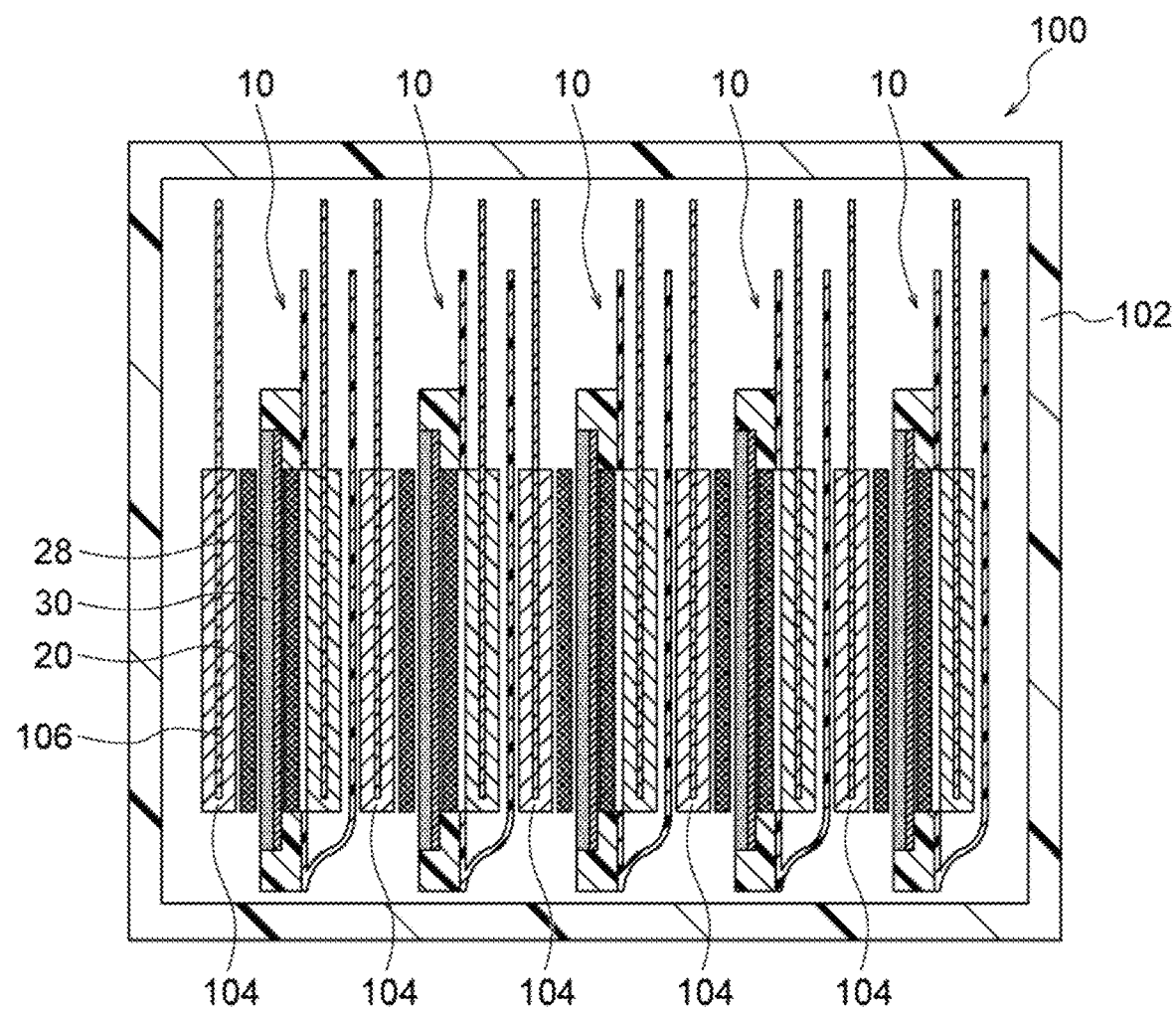
FIG. 1B is a schematic cross-sectional view of a nickel-zinc battery including the electrode cartridge shown in FIG. 1A.

FIG. 1B illustrates one embodiment of the zinc secondary battery 100 including such an electrode cartridge 10. As shown in FIG. 1B, the zinc secondary battery 100 includes a hermetic container 102, one or more electrode cartridges 10 accommodated with the top open in the hermetic container 102, a first electrolytic solution (not shown) accommodated in the electrode cartridge 10, the electrode 16 being disposed in the first electrolytic solution, one or more counter electrodes 104 facing the separator structure 12 of the electrode cartridge 10, and a second electrolytic solution (not shown) accommodated in the hermetic container 102, the counter electrode 104 being disposed in the second electrolytic solution. The first electrolytic solution and the second electrolytic solution are each a positive-electrode electrolytic solution or a negative-electrode electrolytic solution, each containing an alkali metal hydroxide aqueous solution. The counter electrode 104 has an opposite polarity to that of the electrode 16 and is a positive electrode or a negative electrode comprising zinc and/or zinc oxide. The positive electrode may comprises nickel hydroxide and/or nickel oxyhydroxide, and thereby the zinc secondary battery 100 is a nickel zinc battery. The first electrolytic solution and the second electrolytic solution are then isolated from each other so as not to be in fluid communication with each other via the electrode cartridge 10 (in particular, water impermeable case). It should be noted that the collectors, traces and/or terminals are respectively connected to the electrode 16 and the counter electrode 104 so that electricity can be taken out of the zinc secondary battery 100. In such a zinc secondary battery 100, the electrode 16 and the counter electrode 104 are reliably isolated by the separator structure 12 including the separator 28 having hydroxide ion conductivity but having water impermeability. Thus, zinc dendrites growing from the negative electrode to the positive electrode during charge and discharge cycles are blocked by the separator 28, thereby effectively preventing a short circuit between the positive and negative electrodes due to the zinc dendrites. In particular, it is preferred that the zinc secondary battery 100 include a plurality of electrode cartridges 10 and a plurality of counter electrodes 104 and that the electrode cartridge 10 and the counter electrode 104 be alternately disposed. This arrangement of a desired number of electrode cartridges 10 alternately with the counter electrode 104 in the hermetic container 102 leads to significantly easy assembly of the hermetic zinc secondary battery 100 as a stacked-cell battery having a desired number of layers. In particular, a stacked-cell battery having a significantly simplified configuration that is significantly easy to manufacture can be provided because lamination of a plurality of flexible films is unnecessary and the accommodating section (for example, the positive-electrode chamber) of the counter electrode 104 (for example, the positive electrode) is a common accommodating section.

In particular, the electrode cartridge 10 according to the present invention has an advantage in that the stacked-cell battery can be readily fabricated. In the case where a zinc secondary battery is constructed as a stacked-cell battery, each cell is usually accommodated in a hermetic container and liquid-tightly sealed to prevent leakage of the electrolytic solution. Such works are very burdensome and troublesome. As the number of layers of the stacked-cell battery increases, troublesome works are more prominent. In this regard, the electrode cartridge 10 of the present invention has the electrode 16 disposed in an open-top water-impermeable case and a separator 28 on at least one side of the water-impermeable case. Accordingly the basic configuration is achieved only by disposing the counter electrode 104 in the hermetic container 102 and feeding an electrolytic solution (not shown) into the hermetic container 102 and the electrode cartridge 10, resulting in elimination of the hermetic structure at the upper end that requires burdensome work. In addition, the electrode cartridge 10 can be formed while providing sufficient liquid tightness by merely sealing the separator structure 12 and the counter member 14 by, for example, thermal bonding. Accordingly, the burdensome sealing work that requires for a hermetic battery case is greatly saved (or can be completely eliminated), thus leading to a straightforward increase in the number of layers of the stacked-cell battery. It will be appreciated that the hermetic battery is desirable for practical use and the liquid-tightness thereof can be easily achieved by accommodating the electrode cartridge 10 of the present invention in a hermetic container 102 that is liquid-tightly sealed with a lid (it is to be understood that necessary terminal connection must be made). The hardness of the battery container is sufficiently ensured only by the hermetic container 102 that is prepared separately, so that the electrode cartridge 10 itself is not necessarily rigid and the degree of freedom in selecting the material of the electrode cartridge 10 can be high.

The separator structure 12 includes the hydroxide ion-conductive separator 28, separates the positive electrode and the negative electrode, and has water impermeability (preferably both water impermeability and gas impermeability). Accordingly, the electrode 16 and the counter electrode 104 are reliably isolated by the separator structure 12 including the separator 28, so that zinc dendrites growing from the negative electrode toward the positive electrode during charge and discharge cycles are blocked by the separator 28, thereby effectively preventing a short circuit between the positive and negative electrodes due to the zinc dendrite. Preferably, the separator structure 12 is provided with a frame 32 along the outer peripheral edge of the separator 28, and the outer peripheral edge of the counter member 14 and the separator structure 12 are liquid-tightly bonded via the frame 32 other than the upper end portion. Thus, the water impermeable case incorporating the hydroxide ion-conductive separator 28 can be easily prepared while the liquid-tightness at the joint portion between dissimilar members is sufficiently ensured. As shown in FIGS. 1A and 1B, the separator structure 12 preferably includes a frame 32 along the outer edge of the separator 28, and the counter member 14 and the separator structure 12 are preferably liquid-tightly bonded via the frame 32. The frame 32 is preferably a resin frame, and more preferably the counter member 14 and the resin frame 32 are bonded with an adhesive and/or by thermal bonding. The adhesive is preferably an epoxy resin adhesive in view of particularly high alkali resistance. A hot-melt adhesive may also be used. The thermal bonding may be performed through any known technique, such as laser welding, thermocompression bonding, hot plate welding, ultrasonic welding, high-frequency welding, or thermal welding (e.g., welding by pressing in a heated mold or die (e.g., metal mold or die, or welding by heating with a soldering iron). In any case, it is desirable that the liquid tightness is ensured at the joint portion between the counter member 14 and the frame 32. Examples of the resin constituting the frame 32 includes preferably resins having resistance to an alkali metal hydroxide such as potassium hydroxide, more preferably polyolefin resins, ABS resins, PP resins, PE resins, and modified polyphenylene ethers, still more preferably ABS resins, PP resins, PE resins, and modified polyphenylene ethers. As shown in FIGS. 1A and 1B, the separator structure 12 may further include a flexible film 34 along at least a portion of the outer edge of the frame 32. The flexible film can be the same as the flexible film 14a constituting the counter member 14 described later. Furthermore, the flexible film 34 may be directly bonded along the outer edge of the separator 28 without interposing the frame 32. It is more preferred that the flexible film 34 and the resin frame 32, or the flexible film 34 and the separator 28 are bonded with an adhesive and/or by thermal bonding in the same manner as described above. For example, bonding or sealing by thermal bonding may be performed, for example, using a commercially available heat sealer.

The counter member 14 may be composed of any rigid or flexible material that can be liquid-tightly joined to form an internal space in the separator structure 12 and constitute an open-top water impermeable case together with the separator structure 12 (i.e., water impermeable material). Examples of the counter member 14 include not only the flexible film 14a (as shown in FIG. 1A), but also the rigid plate 14b (as shown in FIG. 2A), the separator 14c having the similar structure of the separator 12 as shown in FIG. 3A and the combinations thereof.

According to a preferred embodiment of the present invention, the counter member 14 can be a flexible film 14a like the electrode cartridge 10 and the zinc secondary battery 100 shown in FIGS. 1A and 1B. In this case, the water impermeable case is a bag-shaped flexible package made of the separator structure 12 and the flexible film 14a, and the outer edges other than the upper end portion thereof is sealed to provide an open space. An advantage of this embodiment is that multiple (or as many as possible) electrode cartridges 10 can be readily packed into the hermetic container 102 for the zinc secondary battery 100 without any concern for the design requirements such as dimensional tolerances. In other words, even if they are packed relatively roughly, the stress concentration can be readily avoided by the flexibility of the electrode cartridge 10 (and the fluidity of the electrolytic solution therein), resulting in structural stability and performance stability. The flexible film 14a is preferably a resin film. Preferably, the resin films are resistant to alkali metal hydroxide, such as potassium hydroxide, and can be bonded by thermal bonding. Examples of such resin films include polypropylene (PP), poly(ethylene terephthalate) (PET), and poly(vinyl chloride) (PVC) films. Flexible films such as resin films include commercially available laminate films, preferably thermal laminate films composed of two or more layers including a base film (e.g., PET or PP film) and a thermoplastic resin layer. The flexible films (e.g., laminated films) preferably have a thickness of 20 to 500 μm, more preferably 30 to 300 μm, even more preferably 50 to 150 μm. The outer edge other than the upper end portion is sealed to the separator structure 12, and thus the positive electrode electrolytic solution or the negative electrode electrolytic solution can be reliably held in the water-impermeable case without leakage. The sealing is preferably performed with an adhesive or by thermal bonding. Examples of preferable adhesives include an epoxy resin adhesive because it has significantly high alkali resistance. Sealing by thermal bonding may be performed with, for example, a commercially available heat sealer. The upper end of the water-impermeable case does not need to be sealed by thermal bonding, and therefore the components of the battery can be accommodated in a simple configuration.

Figure 2A:
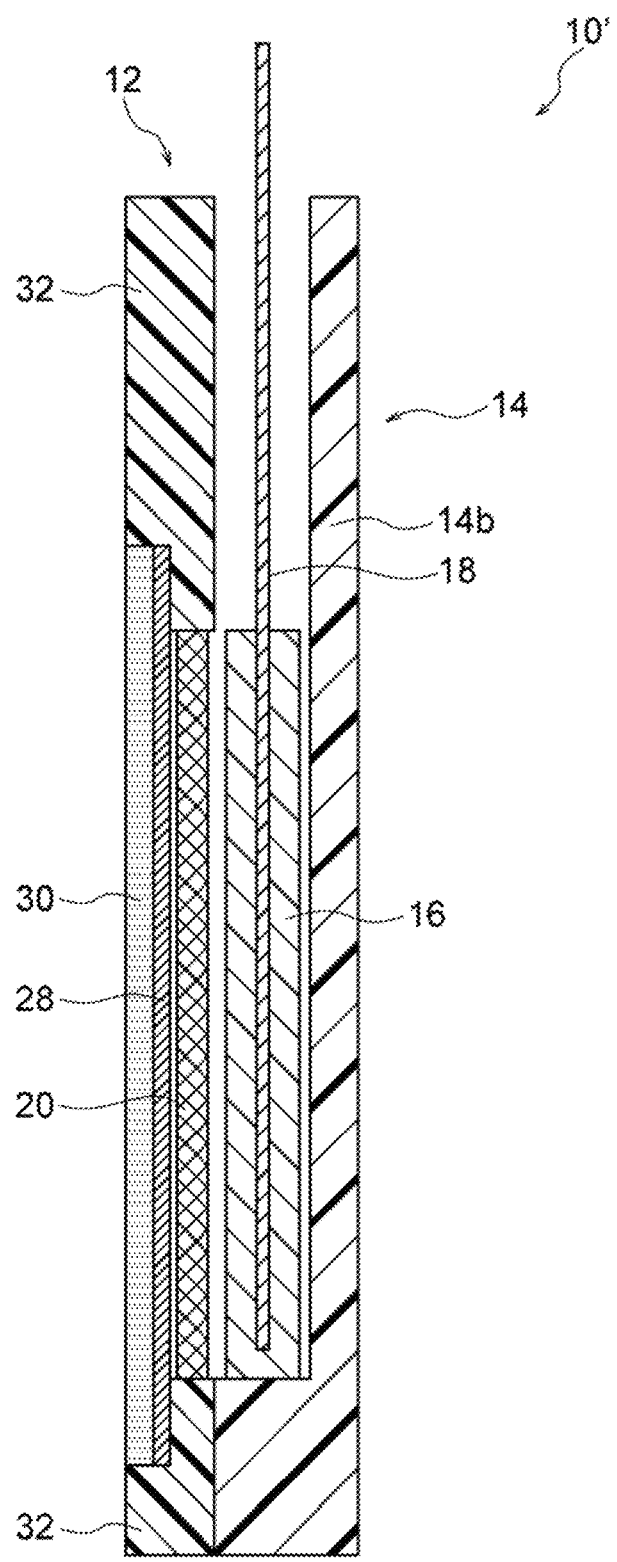
FIG. 2A is a schematic cross-sectional view of an electrode cartridge in another embodiment according to the present invention.
Figure 2B:
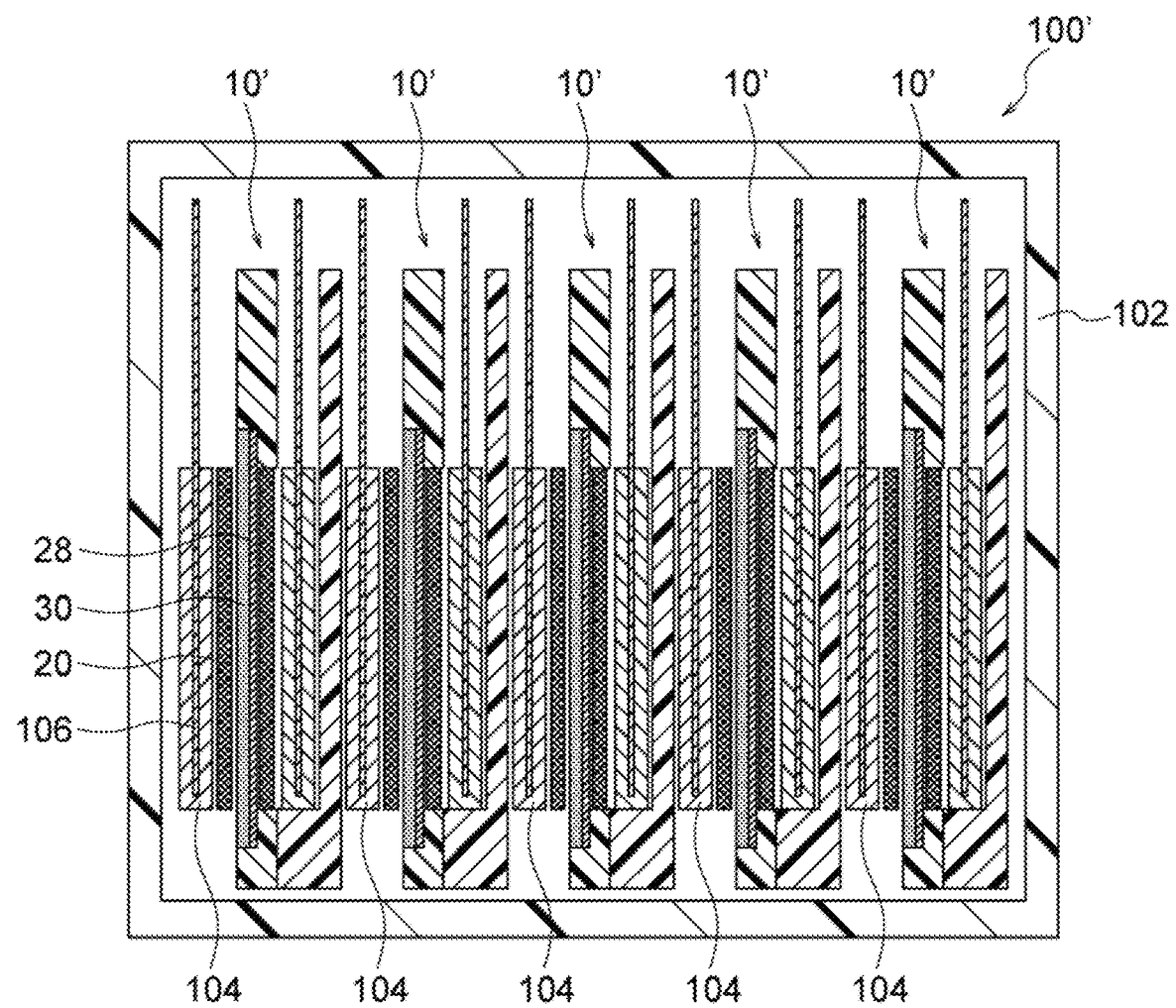
FIG. 2B is a schematic cross-sectional view of a nickel-zinc battery cell having an electrode cartridge shown in FIG. 2A.

According to another preferred embodiment of the present invention, the counter member 14 may be the rigid plate 14b, like the electrode cartridge 10' and the zinc secondary battery 100' shown in FIGS. 2A and 2B. The electrode cartridge 10' is rigid in this embodiment, resulting in advantages such as improvements in handling, structural stability, and performance stability, and high durability, so that damages such as breakage of the film hardly occurs. The rigid plate 14b preferably includes a resin plate. The rigid plate 14b is preferably composed of a resin having resistance to an alkali metal hydroxide such as potassium hydroxide, more preferably a polyolefin resin, ABS resin, PP resin, PE resin, or modified polyphenylene ether, yet more preferably an ABS resin, PP resin, PE resin, or modified polyphenylene ether.

Figure 3A:
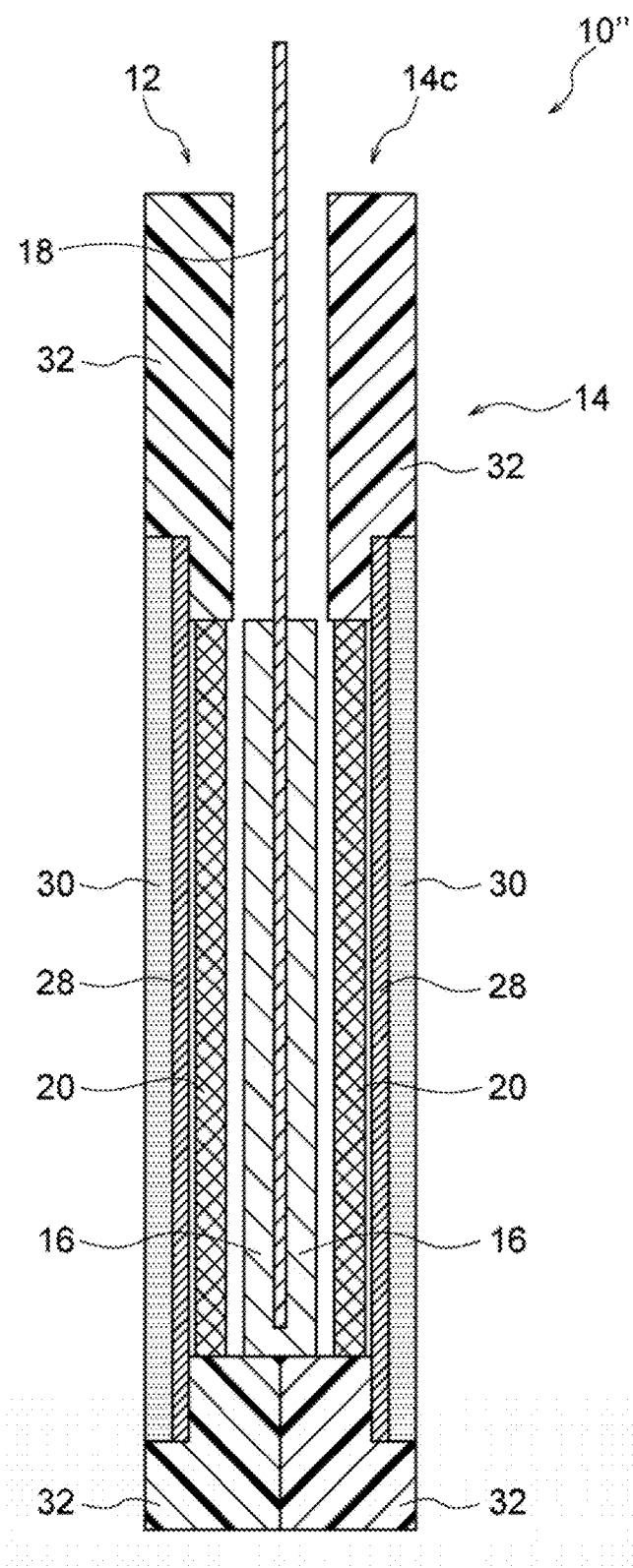
FIG. 3A is a schematic cross-sectional view of an electrode cartridge in still another embodiment according to the present invention.
Figure 3B:
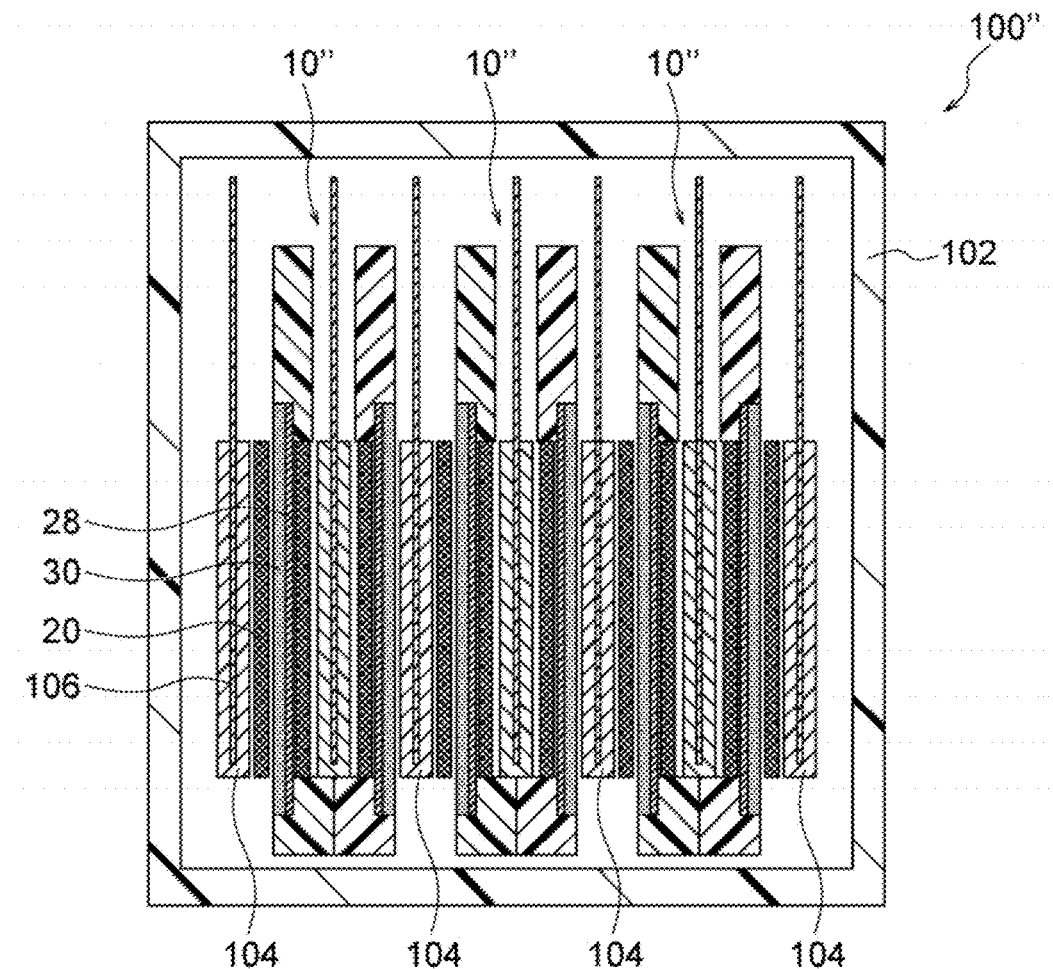
FIG. 3B is a schematic cross-sectional view of a nickel-zinc battery cell having an electrode cartridge shown in FIG. 2A.

According to still another preferred embodiment of the present invention, the counter member 14 may also have a separator structure 14c including the separator 28 having hydroxide ion conductivity and having water impermeability (i.e., the same as the separator structure 12), like the electrode cartridge 10" and the zinc secondary battery 100" shown in FIGS. 3A and 3B. In this embodiment, handling, structural stability, and performance stability are improved, and durability is so high that breakage such as film breakage is less likely to occur. In addition, the space of the counter member 14 can be effectively used as a separator, resulting in space saving. In this case, it is preferred that both the separator structure 12 not constituting the counter member 14 and the separator structure 14c constituting the counter member 14 are each provided with the frame 32 along the outer peripheral edge of the separator 28. It is also preferred that the frame 32 constituting the counter member 14 and the frame 32 not constituting the counter member 14 are liquid-tightly sealed. The frame 32 is preferably a resin frame. The resin of the frame 32 preferably has resistance to alkali metal hydroxide such as potassium hydroxide, and is more preferably a polyolefin resin, ABS resin, PP resin, PE resin, or modified polyphenylene ether, yet more preferably an ABS resin, PP resin, PE resin, or modified polyphenylene ether.

Porous Sheet

It is preferred to provide a porous sheet 20 between the electrode 16 and the separator 28 as shown in FIGS. 1A to 3B. It is also preferred to provide the porous sheet 20 between the counter electrode 104 and the separator 28. The porous sheet 20 desirably has liquid retention, and preferred examples thereof include nonwoven fabrics, woven fabrics, water absorbent resins, and liquid retaining resins, and nonwoven fabrics are particularly preferred. The water absorbent resins or liquid retaining resins are preferably formed into a granular shape, and the granular resins are preferably disposed in a sheet form. The porous sheet 20 can exhibit various functions such as a cushioning material, a liquid retaining material, a detachment preventing material, and a deaeration material, so that it can hold the electrolytic solution in sufficient contact with the separator 28 while preventing the detachment of the particles from the electrode 16 and the counter electrode 104 and/or defoaming, thereby the hydroxide ion conductivity of the separator 28 can be maximized.

Separator

The separator 28 exhibits hydroxide ion conductivity and water impermeability (preferably both water impermeability and gas impermeability), and is typically in a plate, membrane, or layer form. As used herein, the term "water impermeability" indicates that water in contact with one surface of an analyte (e.g., the LDH membrane and/or the porous substrate) does not reach the other surface during the "density evaluation test I" performed in Example 1 described below or any other equivalent method or system. The water impermeability of the separator 28 indicates that the separator 28 has a density sufficiently high to prevent the permeation of water and is not a porous film or any other porous material having water permeability. Thus, this configuration is very effective for physically inhibiting the penetration of dendritic zinc (which may be formed during a charge mode of the battery) through the separator, to prevent the short circuit between the positive and negative electrodes. It should be understood that the separator 28 may be provided with a porous substrate 30, as shown in FIGS. 1A to 3B. In any case, the hydroxide ion conductivity of the separator 28 leads to efficient migration of hydroxide ions between the positive-electrode electrolytic solution and the negative-electrode electrolytic solution, resulting in charge/discharge reaction in the positive-electrode chamber and the negative-electrode chamber. In the case of a nickel-zinc secondary battery, the following reactions occur at the positive-electrode chamber and the negative-electrode chamber during a charge mode of the battery (reverse reactions occur during a discharge mode).

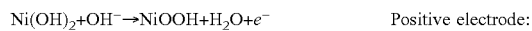

Positive electrode: $Ni(OH)_2 + OH^- \rightarrow NiOOH + H_2O + e^-$

Negative electrode: $ZnO + H_2O + 2e^- \rightarrow Zn + 2OH^-$

The aforementioned reaction at the negative electrode involves the following two reactions:

Dissolution of ZnO: $ZnO + H_2O + 2OH^- \rightarrow Zn(OH)_4^{2-}$

Precipitation of Zn: $Zn(OH)_4^{2-} + 2e^- \rightarrow Zn + 4OH^-$

Figure 20:
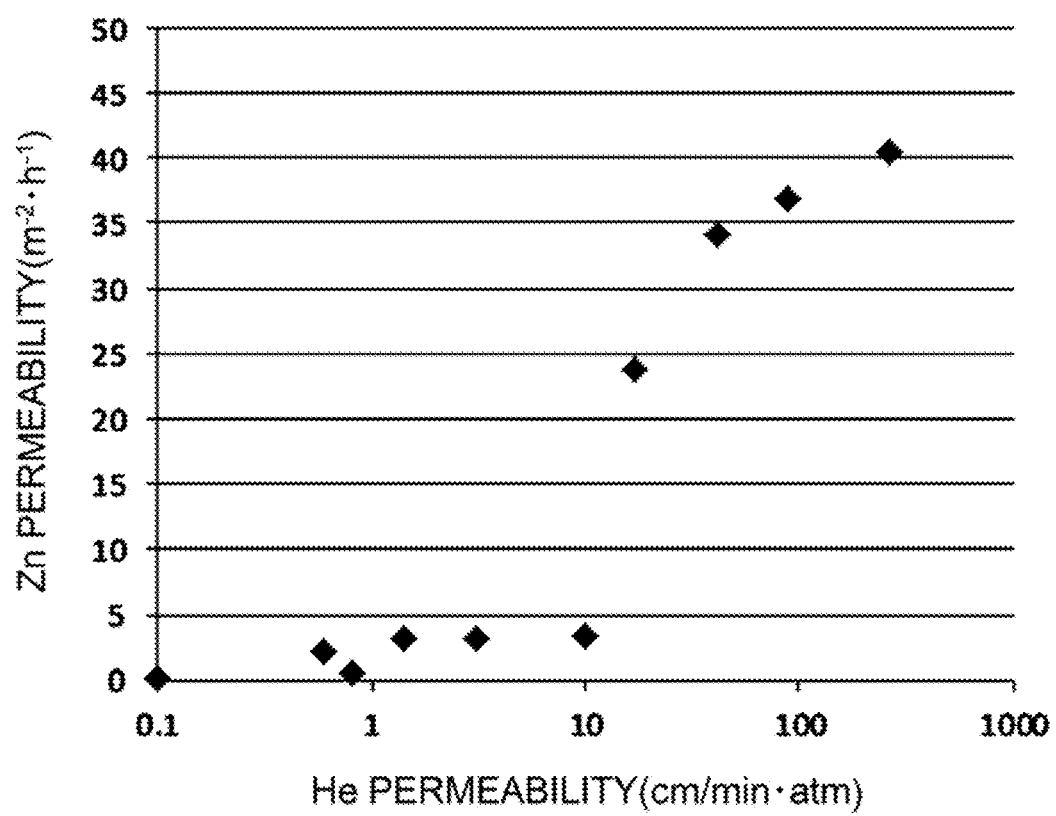
FIG. 20 is a graph showing the relationship between He permeability and Zn permeability determined in Examples 3.

The separator 28 has a He permeability per unit area of preferably 10 cm/min·atm or less, more preferably 5.0 cm/min·atm or less, further preferably 1.0 cm/min·atm or less. A separator having a He permeability of 10 cm/min·atm or less can effectively prevent permeation of Zn (typically permeation of zinc ions or zincate ions) in an electrolytic solution. For example, as illustrated in FIG. 20, a He permeability of 10 cm/min·atm or less leads to a significant reduction in Zn permeability per unit area as determined by the contact of the membrane with water. The upper limit of He permeability of 10 cm/min·atm is critical for the hydroxide-ion-conductive separator to exhibit the effect of reducing Zn permeation. Thus, the separator of the present embodiment significantly reduces Zn permeation. In principle, the use of such a separator for a nickel-zinc secondary battery can effectively prevent growth of dendritic zinc. The determination of He permeability involves a step of feeding He gas to one surface of the separator so that the He gas permeates the dense membrane, and a step of evaluating the density of the separator on the basis of the calculated He permeability. The He permeability is calculated by the expression F/(P×S) where F represents the amount of He gas permeated per unit time, P represents a differential pressure applied to the separator during permeation of He gas, and S represents the membrane area through which He gas permeates. Such determination of the He gas permeability leads to highly accurate evaluation of the density of the membrane, resulting in effective evaluation of a density sufficient to prevent permeation (to allow permeation of very small amounts) of substances other than hydroxide ions (in particular, Zn, which may cause growth of dendritic zinc). This effective evaluation is attributed to the following fact. He gas has very low reactivity and consists not of molecules but of He atoms each being the smallest in size among various gaseous atoms and molecules. In contrast, hydrogen gas consists of $H_2$ molecules each being larger in size than a He atom, and $H_2$ gas is dangerous due to its combustibility. The He gas permeability determined by the aforementioned expression can be used for the objective and convenient evaluation of density, regardless of the size of a sample or the conditions of measurement. Thus, the He permeability can be used for conveniently, safely, and effectively determining whether the separator has a sufficiently high density suitable for use as a separator for a zinc secondary battery. The He permeability is preferably determined through the procedure described below in Example 3.

The separator 28 has a Zn permeability per unit area of preferably 10 $m^{-2} \cdot h^{-1}$ or less, more preferably 5.0 $m^{-2} \cdot h^{-1}$ or less, still more preferably 4.0 $m^{-2} \cdot h^{-1}$ or less, still more preferably 3.0 $m^{-2} \cdot h^{-1}$ or less, still more preferably 1.0 $m^{-2} \cdot h^{-1}$ or less, as determined by the contact of the membrane with water. Such a low Zn permeability indicates that the permeation of Zn through the separator is very effectively prevented in an electrolytic solution. In principle, the use of such a separator for a nickel-zinc secondary battery can effectively prevent growth of dendritic zinc. The determination of Zn permeability involves a step of causing Zn to permeate the separator for a predetermined period of time, and a step of calculating Zn permeability. Zn is caused to permeate the separator by bringing one surface of the separator into contact with a first aqueous solution containing Zn, and bringing the other surface of the separator into contact with water or a second aqueous solution not containing Zn. The Zn permeability is calculated by the expression $(C_2 \times V_2)/(C_1 \times V_1 \times t \times S)$ where $C_1$ represents the Zn concentration of the first aqueous solution before the permeation of Zn, $V_1$ represents the volume of the first aqueous solution before the permeation of Zn, $C_2$ represents the Zn concentration of the second aqueous solution or water after the permeation of Zn, $V_2$ represents the volume of the second aqueous solution or water after the permeation of Zn, t represents the permeation time of Zn, and S represents the membrane area through which Zn permeates. The parameters $C_1$, $C_2$, $V_1$, $V_2$, t, and S each may have any unit if the concentrations $C_1$ and $C_2$ have the same unit and the volumes $V_1$ and $V_2$ have the same unit. Preferably, the permeation time t of Zn has a unit of h, and the membrane area S has a unit of $m^2$. The Zn concentration $C_1$ of the first aqueous solution before the permeation of Zn is preferably 0.001 to 1 mol/L, more preferably 0.01 to 1 mol/L, still more preferably 0.05 to 0.8 mol/L, particularly preferably 0.2 to 0.5 mol/L, most preferably 0.35 to 0.45 mol/L. The permeation time of Zn is preferably 1 to 720 hours, more preferably 1 to 168 hours, still more preferably 6 to 72 hours, particularly preferably 12 to 24 hours. Such determination of the Zn permeability with an aqueous Zn-containing solution and an aqueous Zn-free solution leads to highly accurate evaluation of the density of the membrane, resulting in reliable and precise evaluation of a density sufficient to prevent permeation (to allow permeation of a very small amount) of Zn, which may cause growth of dendritic zinc in a zinc secondary battery. The Zn permeability determined by the aforementioned expression can be used for the objective and convenient evaluation of density, regardless of the size of a sample or the conditions of measurement. The Zn permeability can be used as an effective index for determining the degree of precipitation of dendritic zinc, for the following reason. In principle, the use of the hydroxide-ion-conductive dense membrane as a separator for a zinc secondary battery can effectively prevent growth of dendritic zinc in a Zn-free electrolytic solution (at the positive electrode) if Zn contained in an electrolytic solution (at the zinc negative electrode) in contact with one surface of the separator does not permeate the separator into the originally Zn-free electrolytic solution in contact with the other surface of the separator. According to this embodiment, the Zn permeability can be used for reliably and accurately determining whether the separator has a sufficiently high density suitable for use as a separator for a zinc secondary battery. The Zn permeability is preferably determined through the procedure described below in Example 3.

Preferably, the separator 28 is a ceramic separator comprising an inorganic solid electrolyte. The use of the separator 28 comprising a hydroxide-ion-conductive inorganic solid electrolyte separates the electrolytic solutions between the positive and negative electrodes, and ensures conduction of hydroxide ions. The inorganic solid electrolyte of the separator 28 is typically a dense and hard inorganic solid electrolyte, and thus can physically inhibit the penetration of dendritic zinc (which may be formed during a charge mode of the battery) through the separator, to prevent the short circuit between the positive and negative electrodes, resulting in significantly improved reliability of the zinc secondary battery such as the nickel-zinc battery. The inorganic solid electrolyte is desirably densified to exhibit water impermeability. For example, the inorganic solid electrolyte has a relative density of preferably 90% or more, more preferably 92% or more, still more preferably 95% or more, as determined by the Archimedes method. The density may be any value so long as the inorganic solid electrolyte is dense and hard enough to prevent the penetration of dendritic zinc. Such a dense and hard inorganic solid electrolyte may be produced through hydrothermal treatment. Thus, a green compact which has not undergone hydrothermal treatment is not suitable as the inorganic solid electrolyte in the present invention because the compact is not dense and is brittle in the solution. Any process other than hydrothermal treatment may also be used for producing a dense and hard inorganic solid electrolyte.

The separator 28 or the inorganic solid electrolyte may be in the form of a composite body containing particles of an inorganic solid electrolyte exhibiting hydroxide ion conductivity and an auxiliary component that promotes the densification or hardening of the particles. Alternatively, the separator 28 may be in the form of a composite body containing a porous body serving as a substrate and an inorganic solid electrolyte (e.g., a layered double hydroxide) that is precipitated and grown in pores of the porous body to fill the pores. Examples of the materials of the porous body include ceramic materials, such as alumina and zirconia; and insulating materials, such as porous sheets composed of foamed resin or fibrous material.

The inorganic solid electrolyte preferably contains a layered double hydroxide (LDH), which has a basic composition represented by the formula: $M^{2+}_{1-x}M^{3+}_{x}(OH)_2 A^{n-}_{x/n} \cdot mH_2O$ (wherein $M^{2+}$ represents a divalent cation, $M^{3+}$ represents a trivalent cation, $A^{n-}$ represents an n-valent anion, n is an integer of 1 or more, x is 0.1 to 0.4, and m is 0 or more), and is more preferably composed of such an LDH. In the formula, $M^{2+}$ may represent any divalent cation, and is preferably $Mg^{2+}$, $Ca^{2+}$ or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_{32}$. In the formula, preferably, $M^{2+}$ comprises $Mg^{2+}$, $M^{3+}$ comprises $Al^{3+}$, and $A^{n-}$ comprises $OH^-$ and/or $CO_{32}$. In the formula, n is an integer of 1 or more, preferably 1 or 2; x is 0.1 to 0.4, preferably 0.2 to 0.35; and m is any number indicating the molar number of water, being 0 or more, typically a real or integer number exceeding 0 or not less than 1. In the formula, $M^{3+}$ may be partially or entirely replaced with a cation having a valency of 4 or more. In such a case, the coefficient x/n of the anion $A^n$ in the formula may be appropriately varied.

The inorganic solid electrolyte is preferably densified through hydrothermal treatment. The hydrothermal treatment is very effective for the densification of a layered double hydroxide, in particular, an Mg—Al layered double hydroxide. The densification by the hydrothermal treatment involves, for example, a process described in Patent Document 1 (WO2013/118561), in which pure water and a green compact plate are treated in a pressure container at a temperature of 120 to 250° C., preferably 180 to 250° C. for 2 to 24 hours, preferably 3 to 10 hours. A more preferred process involving the hydrothermal treatment will be described below.

A porous substrate 30 may be disposed on either or both of the surfaces of the separator 28. When the porous substrate 30 is disposed on one surface of the separator 28, the porous substrate 30 may be disposed on a surface, adjacent to the negative electrode, of the separator 28 or on a surface, adjacent to the positive electrode, of the separator 28. The porous substrate 30 has water permeability, and thus the positive-electrode electrolytic solution and the negative-electrode electrolytic solution permeate the substrate and reach the separator. The presence of the porous substrate 30 leads to more reliable retention of hydroxide ions on the separator 28. The strength imparted by the porous substrate 30 can reduce the thickness of the separator 28, resulting in a reduction in resistance. A dense membrane or layer of the inorganic solid electrolyte (preferably LDH) may be formed on or in the porous substrate 30. The disposition of the porous substrate on one surface of the separator 28 probably involves a process including preparation of the porous substrate 30 and formation of a membrane of the inorganic solid electrolyte on the porous substrate (this process will be described below). In contrast, the disposition of the porous substrate on the two surfaces of the separator 28 probably involves a process including densification of the raw powder of the inorganic solid electrolyte disposed between two porous substrates. With reference to FIGS. 1A to 3B, the porous substrate 30 is disposed entirely on one surface of the separator 28. Alternatively, the porous substrate 30 may be disposed only on a portion (e.g., a region responsible for charge/discharge reaction) of one surface of the separator 28. For example, the formation of a membrane or layer of the inorganic solid electrolyte on or in the porous substrate 30 typically leads to the process-derived structure; i.e., the porous substrate 30 is disposed entirely on one surface of the separator 28. In contrast, the formation of an independent plate of the inorganic solid electrolyte (having no substrate) may involve the subsequent step of disposing the porous substrate 30 on a portion (e.g., a region responsible for charge/discharge reaction) or the entirety of one surface of the separator 28.

The inorganic solid electrolyte may be in a plate, membrane, or layer form. The inorganic solid electrolyte in a membrane or layer form is preferably disposed on or in the porous substrate. The inorganic solid electrolyte in the form of a plate has a sufficient hardness and more effectively prevents the penetration of dendritic zinc. The inorganic solid electrolyte in a membrane or layer form having a thickness smaller than that of the plate is advantageous in that the electrolyte has a minimum hardness required for preventing the penetration of dendritic zinc and significantly reduces the resistance of the separator. The inorganic solid electrolyte in the form of a plate has a thickness of preferably 0.01 to 0.5 mm, more preferably 0.02 to 0.2 mm, still more preferably 0.05 to 0.1 mm. The inorganic solid electrolyte preferably exhibits a high hydroxide ion conductivity. The inorganic solid electrolyte typically exhibits a hydroxide ion conductivity of $10^{-4}$ to $10^{-1}$ S/m. The inorganic solid electrolyte in a membrane or layer form has a thickness of preferably 100 µm or less, more preferably 75 µm or less, still more preferably 50 µm or less, particularly preferably 25 µm or less, most preferably 5 Lm or less. Such a small thickness achieves a reduction in resistance of the separator 28. The lower limit of the thickness may vary depending on the intended use of the inorganic solid electrolyte. The thickness is preferably 1 µm or more, more preferably 2 µm or more, in order to secure a hardness required for a separator membrane or layer.

Positive Electrode

Either one of the electrode 16 and the counter electrode 104 is a positive electrode. In the case of nickel-zinc secondary battery, the positive electrode (typically a positive electrode plate) contains nickel hydroxide and/or nickel oxyhydroxide. The nickel-zinc battery in a discharge end state may involve the use of nickel hydroxide in the positive electrode. The nickel-zinc battery in a full charge state may involve the use of nickel oxyhydroxide in the positive electrode. Nickel hydroxide or nickel oxyhydroxide is a common positive-electrode active material used in nickel-zinc batteries and is typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include particulate metallic cobalt and particulate cobalt oxide (e.g., cobalt monoxide). Particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive electrode may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive electrode may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

Negative Electrode

The negative electrode is one of the electrode 16 and the counter electrode 104, is preferably the electrode 16. In detail, it is preferred that the electrode 16 in the electrode cartridge 10 be a negative electrode, while the counter electrode 104 be a positive electrode. Even if the shape integrity of the negative electrode is in a condition susceptible to be impaired due to charge and discharge cycles in this case, the desirable shape of the negative electrode can be kept by the water impermeable case of the electrode cartridge 10 and can continue to participate in the charge and discharge cycles, resulting in stable cell performance. The negative electrode (typically a negative electrode plate) contains zinc and/or zinc oxide. Zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative electrode 20 may be in the form of gel, or may be combined with the electrolytic solution to form a negative-electrode mixture. For example, the negative electrode in the form of gel may be readily prepared through addition of the electrolytic solution and a thickener to the negative-electrode active material. Examples of the thickener include poly(vinyl alcohol), poly (acrylic acid) salts, CMC, and alginic acid. Preferred is poly(acrylic acid), which exhibits high resistance to a strong alkali.

The zinc alloy may be a non-amalgamated zinc alloy; i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form. The powdery negative electrode material has a large surface area and is adapted to large current discharge. The negative electrode material (in the case of a zinc alloy) preferably has a mean particle size of 90 to 210 μm. The negative electrode material having such a mean particle size has a large surface area and thus is adapted to large current discharge. In addition, the negative electrode material can be evenly mixed with the electrolytic solution or a gelling agent, and is readily handled during the assembly of the battery.

Collector

It is preferred that the electrode cartridge 10 further include a collector 18 provided in contact with the electrode 16. It is also preferred that the zinc secondary battery 100 further include a counter collector 106 provided in contact with the counter electrode 104. The collector 18 and the counter collector 106 are respectively a negative-electrode collector and a positive-electrode collector, or a positive-electrode collector and a negative-electrode collector. In either case, it is preferred that both the collector 18 and the counter collector 106 further extend beyond the upper end of the water impermeable case. Furthermore, the zinc secondary battery 100 is preferably in contact with the counter electrode 104 and extends beyond the upper end of the water-impermeable case of the electrode cartridge 10. It is preferred in this case that the extending portion of the collector 18 and the extending portion of the counter collector 106 extend at mutually different positions (e.g., symmetrical positions), and it is particularly preferred that the extending portions of the collectors 18 be connected to each other and/or the extending portions of the counter collectors 106 be connected to each other. Alternatively, the positive-electrode collector and the negative-electrode collector may be respectively configured such that the positive electrode and the negative electrode are respectively connected to a separately provided positive-electrode terminal and a separately provided negative-electrode terminal inside or outside of the electrode cartridge 10 or hermetic container 102. Preferred examples of the positive-electrode collector include nickel porous substrates, such as foamed nickel plates. In such a case, a paste containing an electrode active material (e.g., nickel hydroxide) may be evenly applied onto a nickel porous substrate and then dried, to prepare a positive-electrode plate composed of the positive electrode on the positive-electrode collector. After the drying step, the positive-electrode plate (i.e., the positive electrode on the positive-electrode collector) is preferably subjected to pressing for prevention of detachment of the electrode active material or an improvement in electrode density. Preferred examples of the negative-electrode collector include punched copper sheets. In such a case, a mixture containing zinc oxide powder and/or zinc powder and an optional binder (e.g., particulate polytetrafluoroethylene) may be applied onto a punched copper sheet to prepare a negative-electrode plate composed of the negative electrode on the negative-electrode collector. After the drying of the mixture, the negative-electrode plate (i.e., the negative electrode on the negative-electrode collector) is preferably subjected to pressing for prevention of detachment of the electrode active material or an improvement in electrode density.

Electrolytic Solution

In the case of a typical zinc secondary battery such as a nickel-zinc secondary battery, each of the positive-electrode electrolytic solution and the negative-electrode electrolytic solution contains an alkali metal hydroxide. In other words, an aqueous solution containing an alkali metal hydroxide is used as the positive-electrode electrolytic solution and the negative-electrode electrolytic solution. Examples of the alkali metal hydroxide include potassium hydroxide, sodium hydroxide, lithium hydroxide, and ammonium hydroxide. More preferred is potassium hydroxide. The electrolytic solution may contain a zinc compound, such as zinc oxide or zinc hydroxide, for preventing the self-dissolution of a zinc alloy. As described above, the positive-electrode electrolytic solution and the negative-electrode electrolytic solution may be in the form of a positive-electrode mixture and/or a negative-electrode mixture prepared through combination with the positive electrode and/or the negative electrode. Alternatively, the electrolytic solution may be formed into a gel for preventing the leakage of the solution. The gelling agent is preferably a polymer that swells through absorption of the solvent of the electrolytic solution. Examples of the gelling agent include polymers, such as poly(ethylene oxide), poly(vinyl alcohol), and polyacrylamide; and starch.

Hermetic Container

The hermetic container 102 can be composed of any material that has resistance to an alkali metal hydroxide such as potassium hydroxide. Examples of the material includes preferably resins such as polyolefin resins, ABS resins, modified polyphenylene ethers, more preferably ABS resins and modified polyphenylene ethers. In the hermetic container 102, the electrode cartridges 10, 10', 10" and the counter electrodes 104 may be connected in series to each other, but are preferably connected in parallel with each other. It is to be understood that the electrode cartridges 10, 10', 10" and the counter electrode 104 should be accommodated vertically in the hermetic container 102 since the electrode cartridges 10, 10', 10" are open at the top. The hermetic container 102 typically includes a body and a lid, and the electrode cartridges 10, 10', 10", the counter electrode 104 are accommodated together with the electrolytic solution, the terminal connection is performed as necessary and then the lid is closed. It is preferred that the lid and the casing are sealed by a sealing technique such as an adhesive agent or thermal bonding.

LDH Separator with Porous Substrate

Figure 4:
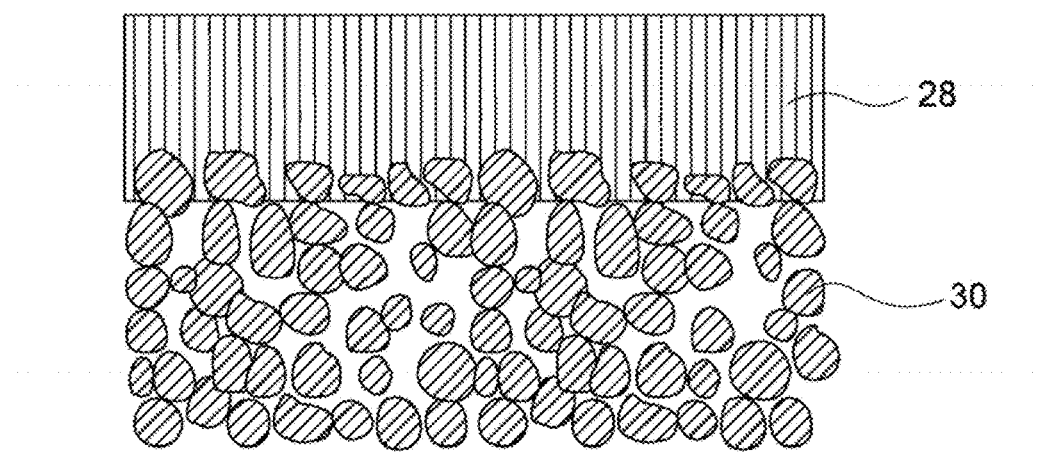
FIG. 4 is a schematic cross-sectional view of a porous substrate-supported separator in an embodiment.
Figure 5:
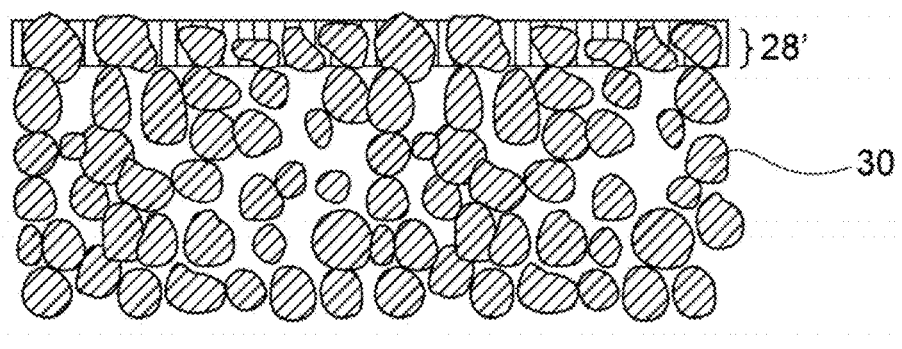
FIG. 5 is a schematic cross-sectional view of a porous substrate-supported separator in another embodiment.

As described above, the porous substrate-supported separator preferably used in the electrode cartridge of the present invention includes a separator composed of a hydroxide-ion-conductive inorganic solid electrolyte and a porous substrate disposed on at least one surface of the separator. The inorganic solid electrolyte is in the form of a membrane or layer densified enough to have water impermeability. The particularly preferred porous substrate-supported separator includes a porous substrate and a separator layer formed on and/or in the porous substrate. The separator layer contains the aforementioned layered double hydroxide (LDH). The separator layer preferably exhibits water impermeability and gas impermeability. Preferably, the porous substrate exhibits water permeability and gas permeability because of the presence of pores, and the separator layer composed of LDH exhibits high density and thus water impermeability and gas impermeability. The separator layer is preferably formed on the porous substrate. As illustrated in FIG. 4, it is preferred that the separator layer 28 in the form of an LDH dense membrane be formed on the porous substrate 30. In such a case, in view of the characteristics of the porous substrate 30, LDH may be formed in pores in the surface and its vicinity of the porous substrate 30, as illustrated in FIG. 4. Alternatively, as illustrated in FIG. 5, LDH may be densely formed in the porous substrate 30 (e.g., in pores in the surface and its vicinity of the porous substrate 30) such that at least a portion of the porous substrate 30 forms the separator layer 28'. The separator illustrated in FIG. 5 has a structure prepared by removal of a portion corresponding to the membrane of the separator layer 28 of the separator illustrated in FIG. 4. The separator may have any other structure such that the separator layer is disposed parallel to the surface of the porous substrate 30. In any case, the separator layer composed of LDH is highly-densified and thus exhibits water impermeability and gas impermeability. Thus, the separator layer exhibits particular characteristics, i.e. hydroxide ion conductivity, water impermeability, and gas impermeability (i.e., the layer basically allows only hydroxide ions to pass therethrough).

The porous substrate is preferably one on which and/or in which the LDH-containing separator layer can be formed. The porous substrate may be composed of any material and may have any porous structure. In a typical embodiment, the LDH-containing separator layer is formed on and/or in the porous substrate. Alternatively, the LDH-containing separator layer may be formed on a non-porous substrate, and then the non-porous substrate may be modified into a porous form by any known process. In any case, the porous substrate preferably has a water-permeable porous structure because such a porous structure enables an electrolytic solution to come into contact with the separator layer in the case of the use of the layer as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. Preferred examples of the metal material include aluminum and zinc. Preferred examples of the polymer material include polystyrene, polyether sulfone, polypropylene, epoxy resins, polyphenylene sulfide, hydrophilized fluororesins (e.g., poly(tetrafluoroethylene) (PTFE)), and any combination thereof. More preferably, a material having alkali resistance (i.e., resistance to an electrolytic solution of a battery) is appropriately selected from among the preferred materials described above.

The porous substrate has an average pore size of preferably 0.001 to 1.5 µm, more preferably 0.001 to 1.25 µm, still more preferably 0.001 to 1.0 µm, particularly preferably 0.001 to 0.75 µm, most preferably 0.001 to 0.5 µm. These ranges make it possible to form a dense LDH-containing separator layer exhibiting water impermeability while ensuring desired water permeability in the porous substrate. In the present invention, the average pore size can be determined by measuring the largest length of each pore in an electron microscopic (SEM) image of the surface of the porous substrate. The magnification of the electron microscopic (SEM) image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The selected pore sizes of two fields of view are then averaged to yield the average pore size. The pore size can be measured by, for example, a length-measuring function of a SEM or image analysis software (e.g., Photoshop manufactured by Adobe).

The surface of the porous substrate has a porosity of preferably 10 to 60%, more preferably 15 to 55%, still more preferably 20 to 50%. These ranges make it possible to form a dense LDH-containing separator layer that exhibits water impermeability, while ensuring desired water permeability of the porous substrate. The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the porous substrate by image processing. More preferably, the porosities in three 6 µm×6 µm areas selected at random are averaged for objective evaluation.

The separator layer is formed on and/or in the porous substrate, preferably on the porous substrate. For example, the separator layer 28 formed on the porous substrate 30 as illustrated in FIG. 4 is in the form of an LDH dense membrane, and the LDH dense membrane is typically composed of LDH. The separator layer 28' formed in the porous substrate 30 as illustrated in FIG. 5 is typically composed of at least a portion of the porous substrate 30 and LDH because LDH is densely formed in the porous substrate 30 (typically in pores in the surface and its vicinity of the porous substrate 30). The separator layer 28' illustrated in FIG. 5 is prepared through removal of a membrane portion of the separator layer 28 illustrated in FIG. 4 by any known technique, such as polishing or machining.

The separator layer preferably exhibits water impermeability and gas impermeability. For example, if water is brought into contact with one surface of the separator layer at 25° C. for one week, water does not permeate the separator layer, and if helium gas is fed to one surface of the separator layer under application of a differential pressure of 0.5 atm, helium gas does not permeate the separator layer. The separator layer composed of LDH preferably has a density sufficient to exhibit water impermeability and gas impermeability. If the functional membrane has local and/or incidental defects exhibiting water permeability, the defects may be filled with an appropriate repairing agent (e.g., an epoxy resin) for ensuring water impermeability and gas impermeability. Such a repairing agent does not necessarily exhibit hydroxide ion conductivity. In any case, the surface of the separator layer (typically LDH dense membrane) has a porosity of preferably 20% or less, more preferably 15% or less, still more preferably 10% or less, particularly preferably 7% or less. A lower porosity of the surface of the separator layer indicates a higher density of the separator layer (typically LDH dense membrane). Such a high density is preferred. The surface porosity of the separator layer is used in the present invention because it can be readily measured by image processing described below and substantially reflects the internal porosity of the separator layer. Thus, if the surface of the separator layer is dense, the inside of the separator layer is also dense. In the present invention, the porosity of the surface of the separator layer can be measured by a method involving image processing as follows: 1) an electron microscopic (SEM) image of the surface of the separator layer is taken at a magnification of 10,000 or more; 2) the grayscale SEM image is read with image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 μm×6 μm area of the surface of the separator layer by image processing. More preferably, the porosities in three 6 μm×6 μm areas selected at random are averaged for objective evaluation.

The layered double hydroxide is composed of an aggregation of platy particles (i.e., platy LDH particles). Preferably, these platy particles are oriented such that the tabular faces of the platy particles are perpendicular to or oblique to the surface of the porous substrate (i.e., the substrate surface). In particular, this preferred embodiment is applied to the case where the separator layer 28 is disposed in the form of an LDH dense membrane on the porous substrate 30 as illustrated in FIG. 4. Alternatively, this embodiment may be applied to the case where LDH is densely formed in the porous substrate 30 (typically in pores in the surface and its vicinity of the porous substrate 30), and the separator layer 28' is composed of at least a portion of the porous substrate 30 as illustrated in FIG. 5.

Figure 6:
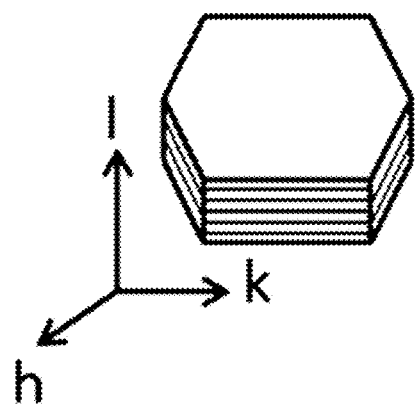
FIG. 6 is a schematic illustration of a platy particle of layered double hydroxide (LDH).

As illustrated in FIG. 6, the LDH crystal is in the form of a platy particle with a layered structure. The perpendicular or oblique orientation described above is significantly beneficial for the LDH-containing separator layer (e.g., LDH dense membrane), because an oriented LDH-containing separator layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the present applicant has revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the perpendicular or oblique orientation in the LDH-containing separator layer according to this embodiment fully or significantly leads to the anisotropic hydroxide ion conductivity of the oriented LDH to the thickness direction of the layer (i.e., the direction perpendicular to the surface of the separator layer or the surface of the porous substrate), whereby the conductivity in the thickness direction can be maximally or significantly increased. In addition, the LDH-containing separator layer has a layered structure and thus exhibits lower resistance than an LDH bulk block. The LDH-containing separator layer having such an orientation readily conducts hydroxide ions in the thickness direction of the layer. Because of its high density, the LDH-containing separator layer is very suitable for use as a separator that requires high conductivity across the thickness of the layer and high density.

In a particularly preferred embodiment, the LDH-containing separator layer (typically LDH dense membrane) is composed of the platy LDH particles highly oriented in the perpendicular direction. If the platy LDH particles are highly orientated in the perpendicular direction, the X-ray diffractometry of the surface of the separator layer shows substantially no peak of (003) plane or a peak of (003) plane smaller than that of (012) plane (note: this shall not apply to the case where the porous substrate shows a diffraction peak at the same angle as the peak of (012) plane of the platy LDH particles, because the peak of (012) plane of the platy LDH particles cannot be specified). This characteristic peak profile indicates that the platy LDH particles of the separator layer are oriented perpendicular to the separator layer. It should be noted that the term "perpendicular" as used herein refers to the idea including not only an exactly perpendicular direction but also a substantially perpendicular direction which is similar to the exactly perpendicular direction. The peak of (003) plane is strongest among peaks observed by X-ray diffractometry of non-oriented LDH powder. In contrast, the oriented LDH-containing separator layer shows substantially no peak of (003) plane or the peak of (003) plane smaller than the peak of (012) plane because platy LDH particles are oriented perpendicular to the separator layer. The reason for this is as follows: The c planes (001) including the (003) plane (where I is 3 or 6) are parallel to the layers of platy LDH particles. If the platy LDH particles are oriented perpendicular to the separator layer, the layers of platy LDH particles are also perpendicular to the separator layer and thus the X-ray diffractometry of the surface of the separator layer shows no peak or very small peak of (001) plane (where I is 3 or 6). The peak of (003) plane, if present, tends to be stronger than the peak of (006) plane, and the use of the peak of (003) plane facilitates determination of the perpendicular orientation as compared with the use of the peak of (006) plane. Thus, the oriented LDH-containing separator layer preferably shows substantially no peak of (003) plane or shows the peak of (003) plane smaller than the peak of (012) plane, which indicates that the highly perpendicular orientation is achieved.

The separator layer has a thickness of preferably 100 μm or less, more preferably 75 μm or less, still more preferably 50 μm or less, particularly preferably 25 μm or less, most preferably 5 μm or less. Such a small thickness leads to a reduction in resistance of the separator. The separator layer is preferably formed as an LDH dense membrane on the porous substrate. In this case, the thickness of the separator layer corresponds to the thickness of the LDH dense membrane. If the separator layer is formed in the porous substrate, the thickness of the separator layer corresponds to the thickness of a composite layer composed of LDH and at least a portion of the porous substrate. If the separator layer is formed on and in the porous substrate, the thickness of the separator layer corresponds to the total thickness of the LDH dense membrane and the composite layer. In any case, the separator layer having the above thickness exhibits a low resistance suitable for use in, for example, a battery. The lower limit of the thickness of the oriented LDH membrane, which may vary with the intended use of the membrane, may be any value. In order to ensure the hardness desirable for use in a functional membrane, such as a separator, the thickness is preferably 1 μm or more, more preferably 2 μm or more.

The LDH separator with the porous substrate is preferably produced through a method involving (a) providing a porous substrate, (b) optionally, evenly depositing a material for generating a species from which LDH crystal growth starts (i.e., a material for starting crystal growth) on the porous substrate, and (c) hydrothermally treating the porous substrate to form an LDH membrane.

(a) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina, zirconia (e.g., yttria-stabilized zirconia (YSZ)), and any combination thereof. The use of such a porous ceramic material tends to improve the density of a LDH membrane. In the case of a ceramic porous substrate, the porous substrate is preferably subjected to, for example, ultrasonic cleaning or cleaning with ion-exchange water.

As described above, the porous substrate is more preferably composed of a ceramic material. The ceramic porous substrate may be a commercially available one or may be prepared by any known process. For example, the ceramic porous substrate may be prepared as follows: Ceramic powder (e.g., zirconia powder, boehmite powder, or titania powder), methyl cellulose, and ion-exchange water are mixed in predetermined proportions; the resultant mixture is subjected to extrusion molding; the molded product is dried at 70 to 200° C. for 10 to 40 hours; and the dried product is fired at 900 to 1,300° C. for one to five hours. The amount of methyl cellulose is preferably 1 to 20 parts by weight relative to 100 parts by weight of the ceramic powder. The amount of ion-exchange water is preferably 10 to 100 parts by weight relative to 100 parts by weight of the ceramic powder.

(b) Deposition of Material for Starting Crystal Growth

If needed, a material for generating a species from which LDH crystal growth starts may be evenly deposited on the porous substrate. The even deposition of such a material on the surface of the porous substrate and the subsequent step (c) can form a highly-densified LDH membrane evenly on the porous substrate. Preferred examples of the species from which LDH crystal growth starts include chemical species generating an anion that can enter between layers of LDH, chemical species generating a cation that can constitute LDH, and LDHs.

(i) Anion-Generating Chemical Species

The LDH crystal growth may start from a chemical species generating an anion that can enter between LDH layers. Examples of the anion include $CO_3^{2-}$, $OH^-$, $SO_3^-$, $SO_3^{2-}$, $SO_4^{2-}$ $NO_3^-$, $Cl^-$, $Br^-$, and any combination thereof. A material for generating such a species may be evenly deposited on the surface of the porous substrate by a process suitable for the material. The deposition of such an anion-generating chemical species on the surface of the porous substrate leads to adsorption of a metal cation (e.g., $Mg^{2+}$ or $Al^{3+}$) on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate after the deposition of a polymer on the surface of the porous substrate and subsequent introduction of an anion-generating chemical species into the polymer. In this embodiment, the anion is preferably $SO_3^-$, $SO_3^{2-}$, and/or $SO_4^{2-}$. Such an anion-generating chemical species is preferably introduced into the polymer through sulfonation. The polymer may be an anionizable (in particular, sulfonatable) polymer. Examples of such a polymer include polystyrene, polyether sulfone, polypropylene, epoxy resins, poly(phenylene sulfide), and any combination thereof. Aromatic polymers are particularly preferred because they are readily anionized (in particular, sulfonated). Examples of the aromatic polymers include polystyrene, polyether sulfone, epoxy resins, poly(phenylene sulfide), and any combination thereof. Most preferred is polystyrene. The deposition of the polymer on the porous substrate preferably involves application of a polymer solution to the surface of the porous substrate (preferably, to particles forming the outermost surface of the platy porous substrate). The polymer solution can be readily prepared by, for example, dissolution of a solid polymer (e.g., a polystyrene substrate) in an organic solvent (e.g., xylene). In view of even application of the polymer solution, the solution is preferably applied to the porous substrate such that the solution does not permeate the substrate. Thus, spin coating is preferred for very even deposition or application of the polymer solution. The spin coating may be performed under any conditions; for example, a rotation speed of 1,000 to 10,000 rpm and an operational period of about 60 to 300 seconds (involving dropwise addition and drying). The sulfonation may be performed by immersing the polymer-deposited porous substrate in an acid for sulfonating the polymer, such as sulfuric acid (e.g., concentrated sulfuric acid), fuming sulfuric acid, chlorosulfonic acid, and sulfuric anhydride. Any other sulfonation techniques may also be used. The porous substrate may be immersed in such a sulfonating acid at room temperature or a high temperature (e.g., 50 to 150° C.) for any period of time (e.g., 1 to 14 days).

In another preferred embodiment of the present invention, the material for starting crystal growth may be deposited on the porous substrate by treatment of the surface of the substrate with a surfactant containing an anion-generating chemical species as a hydrophilic moiety. In this embodiment, the anion is preferably $SO_3^-$, $SO_3^{2-}$, and/or $SO_4^{2-}$ Typical examples of such a surfactant include anionic surfactants. Preferred examples of the anionic surfactant include sulfonate anionic surfactants, sulfate anionic surfactants, and any combination thereof. Examples of the sulfonate anionic surfactants include (sodium naphthalenesulfonate)-formalin condensate, disodium polyoxyethylene alkyl sulfosuccinate, poly(sodium styrenesulfonate), sodium dioctyl sulfosuccinate, and polyoxyethylene lauryl ether sulfate triethanolamine. Examples of the sulfate anionic surfactants include sodium polyoxyethylene lauryl ether sulfate. The porous substrate may be treated with a surfactant by any process that can deposit the surfactant on the surface of the substrate; for example, application of a surfactant-containing solution to the porous substrate, or immersion of the porous substrate in a surfactant-containing solution. The porous substrate may be immersed in the surfactant-containing solution with agitation of the solution at room temperature or a high temperature (e.g., 40 to 80° C.) for any period of time (e.g., one to seven days).

(ii) Cation-Generating Chemical Species

The LDH crystal growth may start from a chemical species generating a cation that can constitute the layered double hydroxide. Such a cation is preferably $Al^{3+}$, for example. In this case, the material for starting crystal growth is preferably at least one aluminum compound selected from the group consisting of oxides, hydroxides, oxyhydroxides, and hydroxy complexes of aluminum. A material for generating such a chemical species may be evenly deposited on the surface of the porous substrate by a process suitable for the material. The deposition of such a cation-generating chemical species on the surface of the porous substrate leads to adsorption of an anion that can enter between layers of LDH on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate by application of a sol containing an aluminum compound to the porous substrate. Preferred examples of the aluminum compound include boehmite (AlOOH), aluminum hydroxide ($Al(OH)_3$), and amorphous alumina. Most preferred is boehmite. Spin coating is preferably used for very even application of the sol containing the aluminum compound. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by hydrothermal treatment of the porous substrate in an aqueous solution containing at least aluminum to form an aluminum compound on the surface of the porous substrate. The aluminum compound to be formed on the surface of the porous substrate is preferably $Al(OH)_3$. The LDH membrane on the porous substrate (in particular, a ceramic porous substrate) tends to form crystalline and/or amorphous $Al(OH)_3$ at the initial growth stage. LDH growth may start from the $Al(OH)_3$ serving as a nucleus. Thus, the hydrothermal treatment step (c) after even deposition of $Al(OH)_3$ on the surface of the porous substrate by hydrothermal treatment can evenly form a highly-densified LDH membrane on the surface of the porous substrate. In this embodiment, steps (b) and (c) may be continuously performed in the same hermetic container, or may be sequentially performed in separate containers.

If steps (b) and (c) are continuously performed in the same hermetic container, an aqueous stock solution used in step (c) (i.e., an aqueous solution containing an element constituting LDH) may be used in step (b). In such a case, the hydrothermal treatment in step (b) is performed in a hermetic container (preferably an autoclave) in an acidic or neutral pH range (preferably at a pH of 5.5 to 7.0) at a relatively low temperature of 50 to 70° C., to promote nucleation of $Al(OH)_3$, instead of LDH. After the nucleation of $Al(OH)_3$, the aqueous stock solution is maintained at the nucleation temperature or heated from the temperature, to promote hydrolysis of urea, resulting in an increase in pH of the aqueous stock solution. Thus, step (b) is smoothly followed by step (c) in a pH range suitable for LDH growth (preferably a pH of more than 7.0).

If steps (b) and (c) are sequentially performed in separate containers, it is preferred that different aqueous stock solutions be used for steps (b) and (c). For example, step (b) preferably involves the use of an aqueous stock solution primarily containing an Al source (preferably, not containing a metal other than Al) for nucleation of $Al(OH)_3$. In this case, the hydrothermal treatment in step (b) may be performed at 50 to 120° C. in a hermetic container (preferably an autoclave) different from that used in step (c). Preferred examples of the aqueous stock solution primarily containing an Al source include an aqueous solution containing aluminum nitrate and urea but not containing a magnesium compound (e.g., magnesium nitrate). The use of the Mg-free aqueous stock solution can avoid precipitation of LDH, resulting in promotion of nucleation of $Al(OH)_3$.

In another preferred embodiment of the present invention, the material for starting crystal growth may be deposited on the porous substrate by vapor deposition of aluminum on the surface of the porous substrate and then conversion of the aluminum into an aluminum compound through hydrothermal treatment in an aqueous solution. The aluminum compound is preferably $Al(OH)_3$. In particular, the conversion of aluminum into $Al(OH)_3$ promotes LDH growth from the $Al(OH)_3$ serving as a nucleus. Thus, step (c) of hydrothermal treatment after even formation of $Al(OH)_3$ on the surface of the porous substrate by hydrothermal treatment can evenly form a highly-densified LDH membrane on the surface of the porous substrate. The vapor deposition of aluminum may involve physical or chemical vapor deposition, and preferably involves physical vapor deposition, such as vacuum deposition. The hydrothermal treatment for conversion of aluminum into $Al(OH)_3$ may use any aqueous solution containing a component that can react with the deposited Al to form $Al(OH)_3$.

(iii) LDH as Material for Starting Crystal Growth

The crystal growth may start from LDH. In this case, LDH growth may start form LDH serving as a nucleus. The even deposition of the LDH nucleus on the surface of the porous substrate and subsequent step (c) can form a highly-densified LDH membrane evenly on the porous substrate.

In a preferred embodiment of the present invention, the material for starting crystal growth may be deposited on the porous substrate by application of an LDH-containing sol to the surface of the porous substrate. The LDH-containing sol may be prepared by dispersion of LDH in a solvent, such as water. In this embodiment, spin coating is preferably used for very even application of the LDH-containing sol. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by vapor deposition of aluminum on the surface of the porous substrate and then conversion of the (vapor-deposited) aluminum into LDH through hydrothermal treatment in an aqueous solution containing an element constituting LDH other than aluminum. The vapor deposition of aluminum may involve physical or chemical vapor deposition, and preferably involves physical vapor deposition, such as vacuum deposition. The hydrothermal treatment for conversion of aluminum into LDH may use an aqueous stock solution containing a component other than the vapor-deposited Al. Preferred examples of the aqueous stock solution include an aqueous stock solution primarily containing an Mg source. More preferred is an aqueous solution containing magnesium nitrate and urea but not containing an aluminum compound (e.g., aluminum nitrate). The use of the Mg source-containing aqueous solution results in nucleation of LDH together with the vapor-deposited Al.

(c) Hydrothermal Treatment

The porous substrate (on which the material for starting crystal growth may be deposited if needed) is hydrothermally treated in an aqueous stock solution containing the elements of LDH, to form the LDH membrane on the surface of the porous substrate. Preferably, the aqueous stock solution contains magnesium ions ($Mg^{2+}$) and aluminum ions ($Al^{3+}$) in a specific total concentration and further contains urea. Urea is hydrolyzed into ammonia and raises the pH of the aqueous stock solution (e.g., a pH of more than 7.0, preferably a pH of more than 7.0 and 8.5 or less), and metal ions co-existing in the aqueous stock solution form hydroxides, to produce LDH. The hydrolysis of urea, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, high-density LDH membrane. At a low total concentration of magnesium ions and aluminum ions, the crystal growth dominates over the nucleation, resulting in a decrease in number of LDH particles and an increase in size of the LDH particles. At a high total concentration, the nucleation dominates over the crystal growth, resulting in an increase in number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3^-$) in the aqueous stock solution is preferably 2 to 6, more preferably 4 to 5.

The porous substrate may be immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH perpendicular to the porous substrate (i.e., growth of LDH such that the tabular faces of platy LDH particles are perpendicular to or oblique to the surface of the porous substrate).

The porous substrate is hydrothermally treated in the aqueous stock solution to form the LDH membrane on the surface of the porous substrate. The hydrothermal treatment is performed in a hermetic container (preferably an autoclave) at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH membrane produced as described above is composed of densely assembled platy LDH particles that are oriented in the perpendicular direction, which is beneficial for the conductivity. The LDH membrane typically exhibits water impermeability (preferably both water impermeability and gas impermeability) because of its high density. The LDH membrane is typically composed of an agglomeration of platy particles, and these platy particles are oriented such that the tabular faces of the platy particles are perpendicular to or oblique to the surface of the porous substrate. Thus, the use of the dense LDH membrane having sufficient gas-tight properties in batteries (e.g., zinc-air batteries) will lead to an improvement in electricity generating capacity. Furthermore, the dense LDH membrane is expected to be used in novel applications, such as a separator that can prevent growth of dendritic zinc and permeation of carbon dioxide, which have been large technical barriers against forming a zinc-air secondary battery containing an electrolytic solution that has not been achieved. The dense LDH membrane can also be used in a separator for a nickel-zinc battery that has suffered from growth of dendritic zinc which is an obstacle to practical use of this battery.

The above-described method may form LDH membranes on the two surfaces of the porous substrate. Thus, in order to modify the LDH-containing composite material into a form suitable for use as a separator, the LDH membrane on one surface of the porous substrate is preferably removed through mechanical polishing after the formation of the LDH membranes. Alternatively, it is desirable to take a measure to prevent formation of the LDH membrane on one surface of the porous substrate.

EXAMPLES

The present invention will now be described in more detail by way of examples.

Example 1: Preparation and Evaluation of Porous Substrate-Supported LDH Separator (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 7:
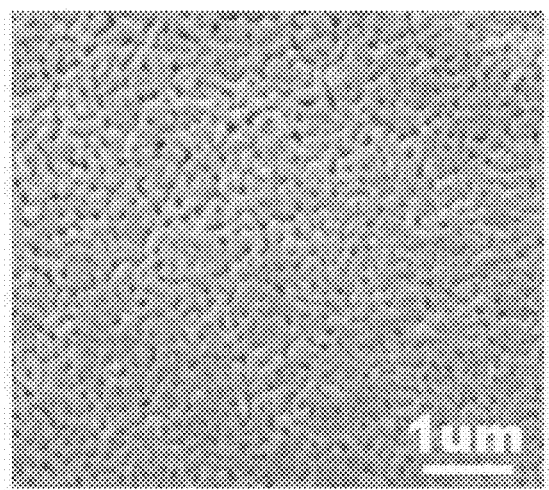
FIG. 7 is a SEM image of the surface of a porous alumina substrate prepared in Example 1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 7 illustrates the SEM image of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The average was determined for two fields of view. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2.6H_2O$, manufactured by KANTO CHEMICAL Co., Inc.), aluminum nitrate nonahydrate ($Al(NO_3)_3.9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 600 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon (registered trademark) container (with an internal volume of 800 mL and a stainless steel jacket). The porous substrate was horizontally suspended and immobilized away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 8:
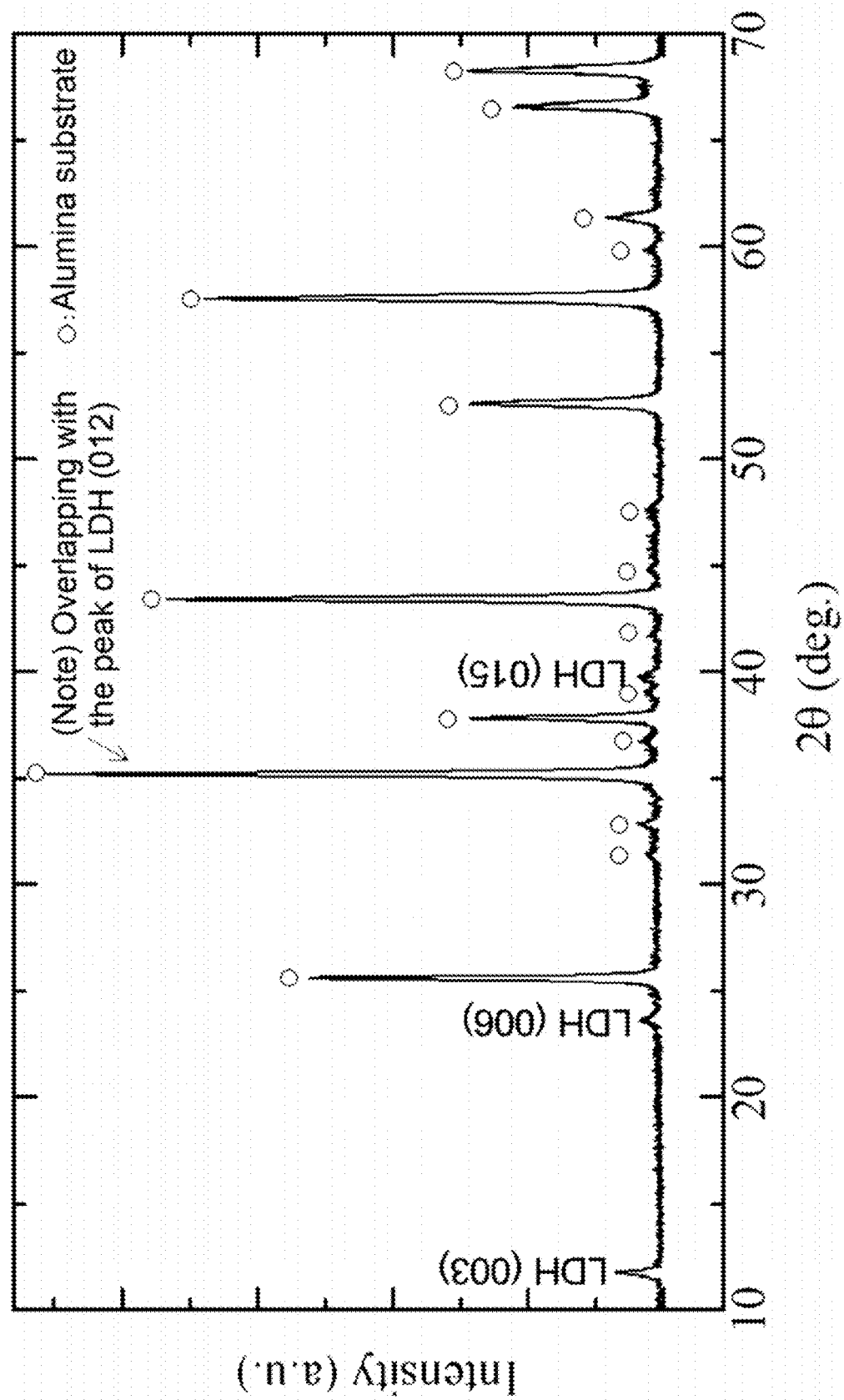
FIG. 8 is an XRD profile of a crystalline phase of a sample in Example 1.

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile is illustrated in FIG. 8. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 8, peaks derived from alumina in the porous substrate on which the membrane sample was formed (i.e., the peaks marked with a circle) were also observed.

(5b) Observation of Microstructure

Figure 9:
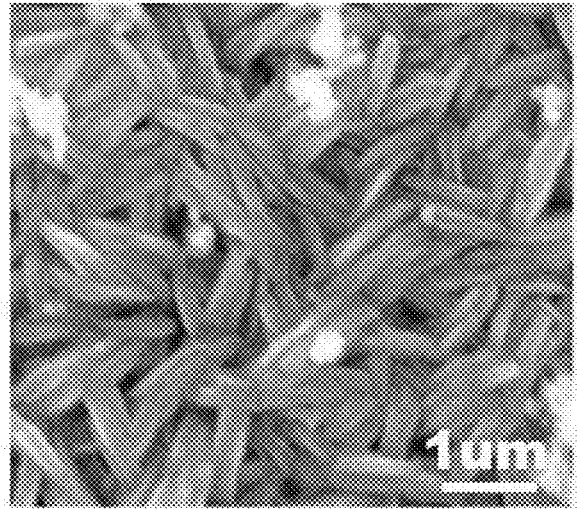
FIG. 9 is a SEM image of a surface microstructure of a sample membrane in Example 1.

The surface microstructure of the membrane sample was observed with a scanning electron microscope (SEM; JSM-6610LV, manufactured by JEOL Ltd.) at an acceleration voltage of 10 to 20 kV. FIG. 9 illustrates the resultant SEM image (i.e., a secondary electron image) of the surface microstructure of the membrane sample.

Figure 10:
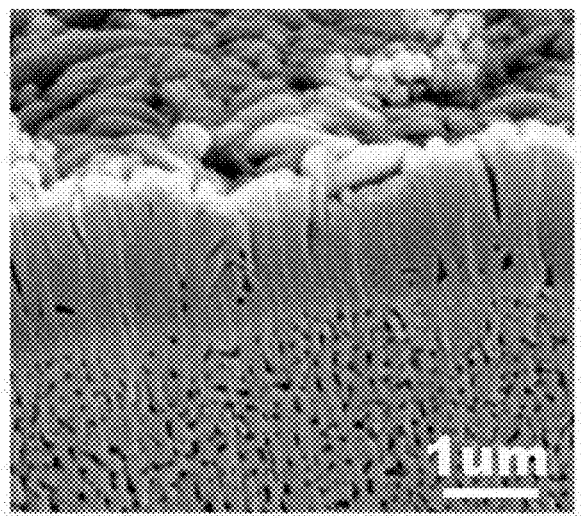
FIG. 10 is a SEM image of a microstructure at a polished cross-sectional surface of a composite material sample in Example 1.

A cross-section of the composite material sample was subjected to CP polishing, and the microstructure of the polished cross-section was observed with a scanning electron microscope (SEM) at an acceleration voltage of 10 to 20 kV. FIG. 10 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the oriented membrane. The porosity was 19.0%. This porosity was used to calculate the density D of the surface of the membrane (hereinafter referred to as "membrane surface density") by the expression: D=100%−(the porosity at the surface of the membrane). The density D was 81.0%.

The porosity at the polished cross-section of the membrane sample was also determined. The porosity was determined as in the above procedure of determining the porosity at the surface of the membrane, except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Density Evaluation Test I

Figure 11A:
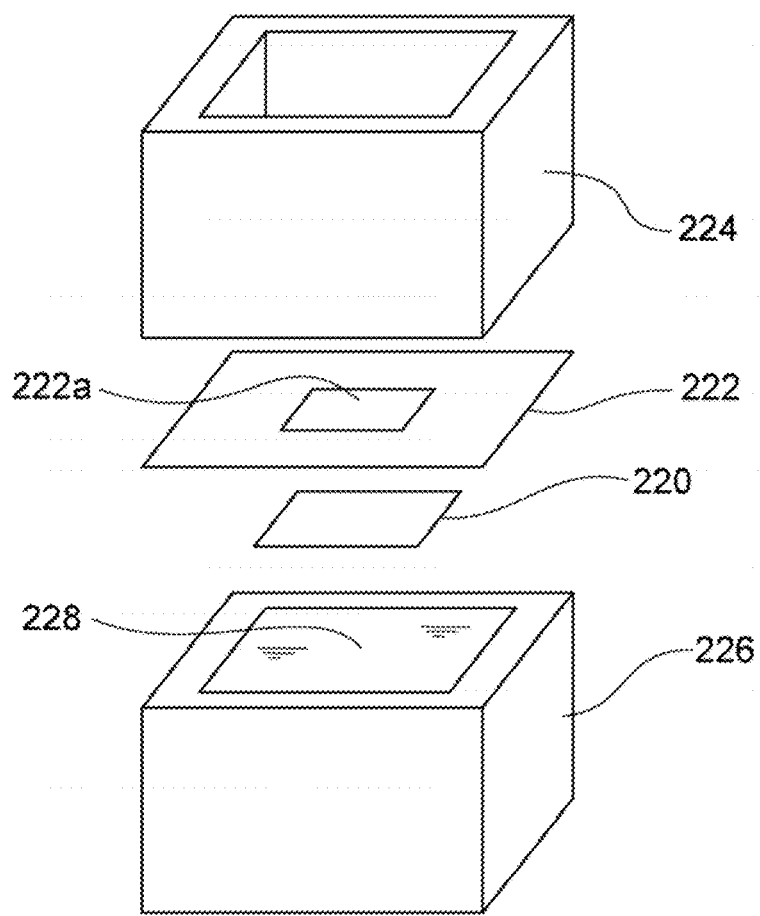
FIG. 11A is an exploded perspective view of a system for evaluating and measuring density in Example 1.
Figure 11B:
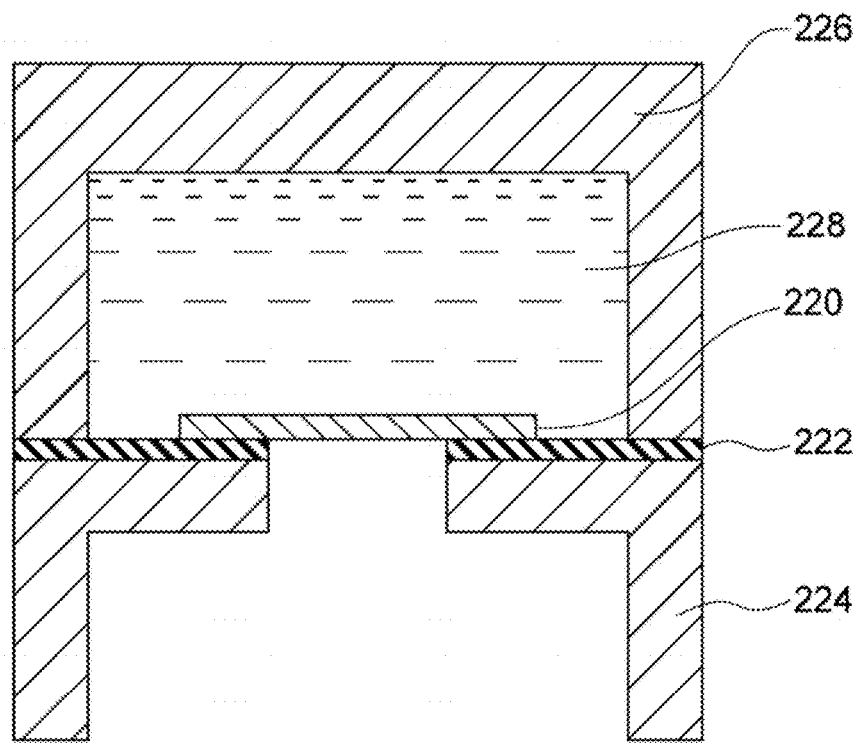
FIG. 11B is a schematic cross-sectional view of a system for evaluating and measuring density in Example 1.

The following density evaluation test was performed on the membrane sample for determining whether the sample has high density and thus water impermeability. With reference to FIG. 11A, a silicone rubber 222 having a central opening 222a (0.5 cm×0.5 cm) was bonded to the membrane sample of composite material sample 220 prepared in (1) above (cut into a piece of 1 cm×1 cm), and the resultant laminate was disposed between two acrylic units 224 and 226 and bonded to these acrylic units. The acrylic unit 224 disposed on the silicone rubber 222 has no bottom, and thus the silicone rubber 222 is bonded to the acrylic unit 224 such that the opening 222a is exposed. The acrylic unit 226 disposed on the porous substrate of the composite material sample 220 has a bottom and contains ion-exchange water 228. In this case, Al and/or Mg may be dissolved in the ion-exchange water. Thus, these components are arranged to form an assembly such that the ion-exchange water 228 comes into contact with the porous substrate of the composite material sample 220 if the assembly is inverted upside down. After formation of the assembly, the total weight thereof was measured. It should be noted the unit 226 has a closed vent (not shown) and the vent is opened after inversion of the assembly. As illustrated in FIG. 11B, the assembly was inverted upside down and left for one week at 25° C., and then the total weight thereof was measured again. Before measurement of the weight of the assembly, water droplets on the inner side(s) of the acrylic unit 224 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

(5e) Density Evaluation Test II

Figure 12A:
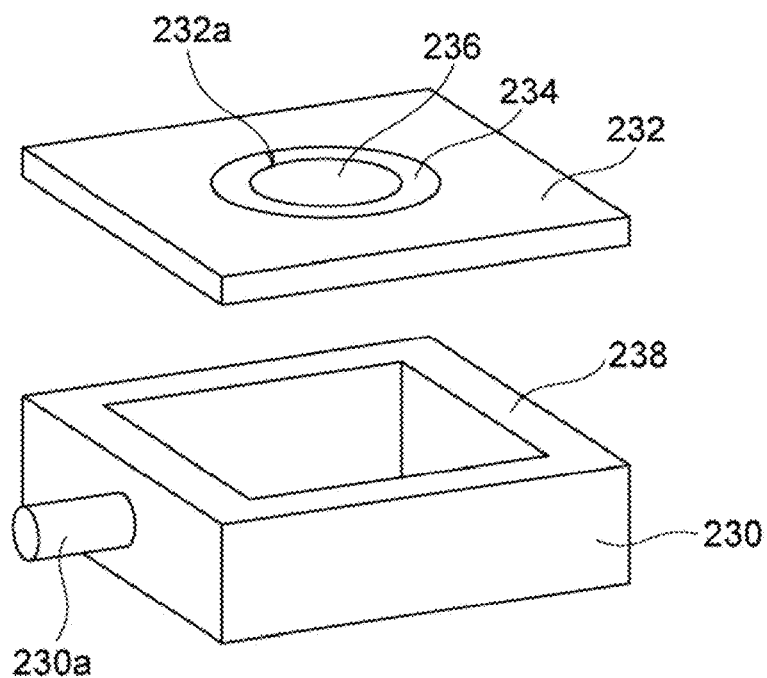
FIG. 12A is an exploded perspective view of a hermetic container used in density evaluation test II in Example 1.
Figure 12B:
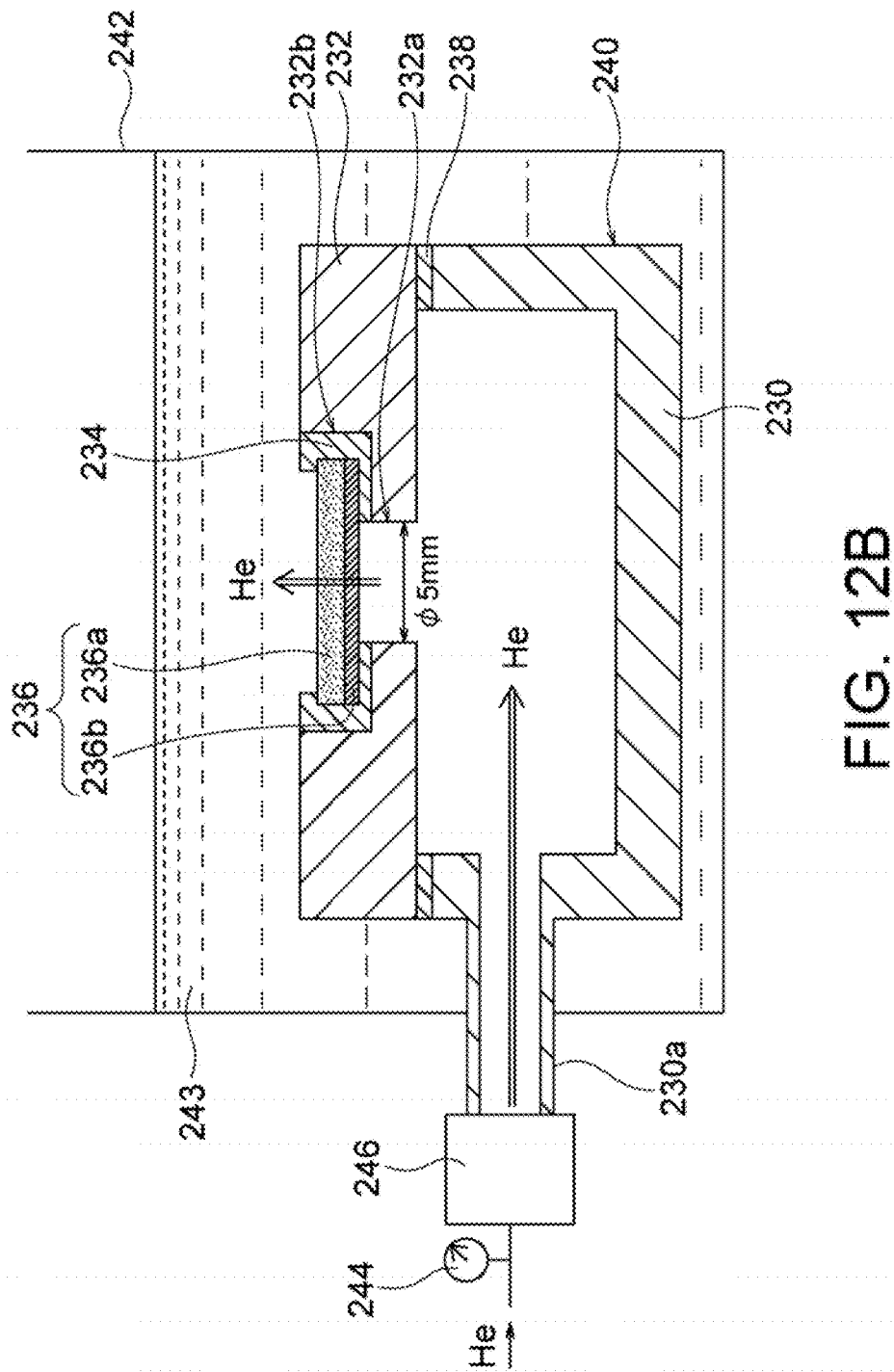
FIG. 12B is a schematic cross-sectional view of a system used in density evaluation test II in Example 1.

The following density evaluation test was performed on the membrane sample for determining whether the sample has high density and thus gas impermeability. As illustrated in FIGS. 12A and 12B, an acrylic container 230 and an alumina jig 232 were provided. The container 230 has no lid, and the jig 232 has a shape and a size such that it serves as a lid for the container 230. The acrylic container 230 has a gas inlet 230a for feeding a gas into the container 230. The alumina jig 232 has an opening 232a having a diameter of 5 mm, and a dent 232b provided around the opening 232a for supporting the membrane sample. An epoxy adhesive 234 was applied to the dent 232b of the alumina jig 232, and a membrane sample 236b of a composite material sample 236 was placed on the dent 232b and gas- and liquid-tightly bonded to the alumina jig 232. The alumina jig 232 provided with the composite material sample 236 was gas- and liquid-tightly bonded to the upper edge of the acrylic container 230 with a silicone adhesive 238 so as to completely cover the opening of the acrylic container 230, to prepare a hermetic container 240 for evaluation. The hermetic container 240 was placed in a water bath 242, and the gas inlet 230a of the acrylic container 230 was connected to a pressure gauge 244 and a flowmeter 246 so as to allow helium gas to be fed into the acrylic container 230. Water 243 was poured into the water bath 242 such that the hermetic container 240 was completely submerged in the water. The hermetic container 240 was ensured to have gas tightness and liquid tightness. The membrane sample 236b of the composite material sample 236 was exposed to the inner space of the hermetic container 240, and the porous substrate 236a of the composite material sample 236 was in contact with the water in the water bath 242. Helium gas was fed into the hermetic container 240 through the gas inlet 230a of the acrylic container 230. The pressure gauge 244 and the flowmeter 246 were monitored to achieve a differential pressure of 0.5 atm at the membrane sample 236b (i.e., the pressure applied to the surface in contact with helium gas was higher by 0.5 atm than water pressure applied to the opposite surface), to determine the presence of helium gas bubbles in the water caused by permeation of helium gas through the composite material sample 236. No helium gas bubbles were observed. The results demonstrate that the membrane sample 236b has high density and thus gas impermeability.

Example 2 (Reference): Preparation of Laminated Nickel-Zinc Battery Cartridge

This example involves preparation of a stacked-cell battery type nickel zinc cartridge (cell pack) including a positive electrode and a negative electrode separated by a separator structure, and corresponds to a reference example (not an example preparation of an electrode cartridge of the present invention). In this example, one of the sections containing the positive electrode (positive-electrode chamber) or containing the negative electrode (negative-electrode chamber) in an independent form corresponds to the electrode cartridge of the present invention. Accordingly, it is to be understood that the electrode cartridge of the present invention can be prepared as appropriate by referring to this example.

(1) Preparation of Separator Structure

Figure 13A:
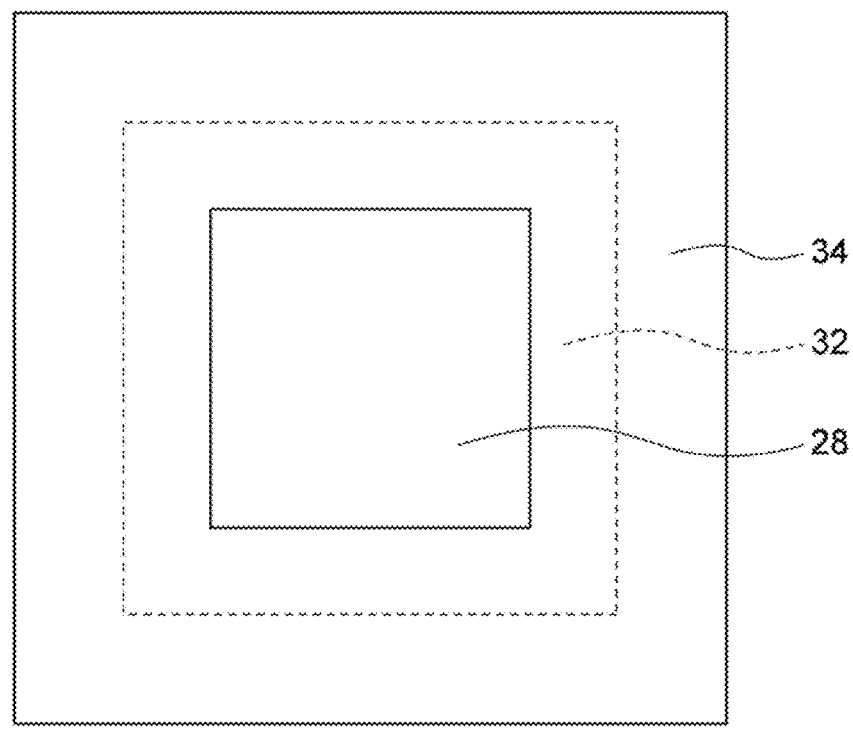
FIG. 13A is a schematic top view of the positioning of each element of a separator structure prepared in Example 2.
Figure 13B:
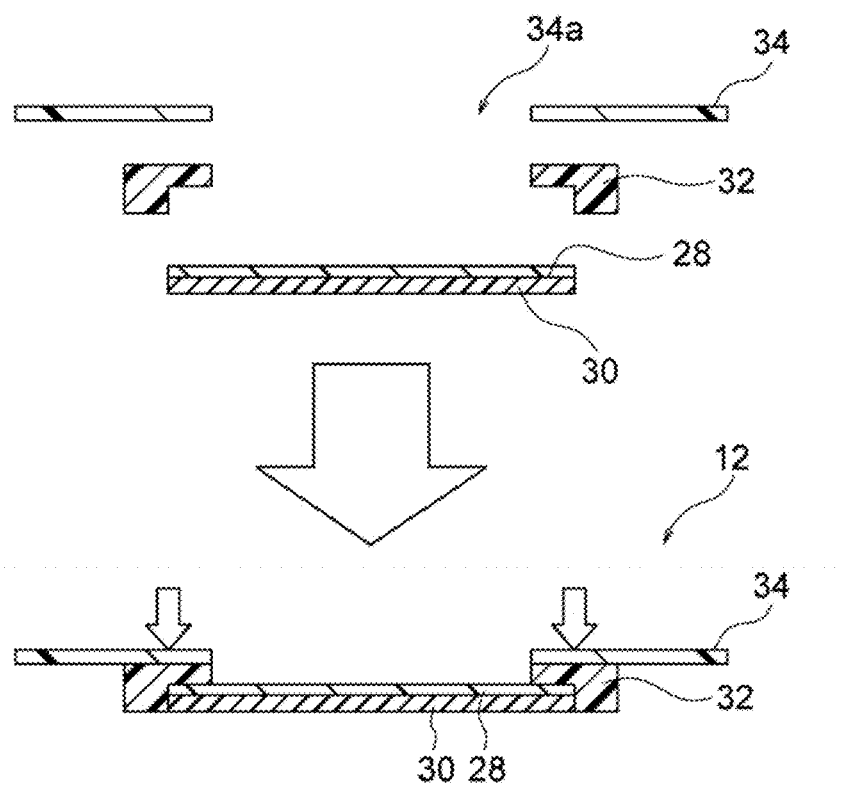
FIG. 13B is a process chart illustrating a process of producing a separator structure prepared in Example 2.
Figure 14:
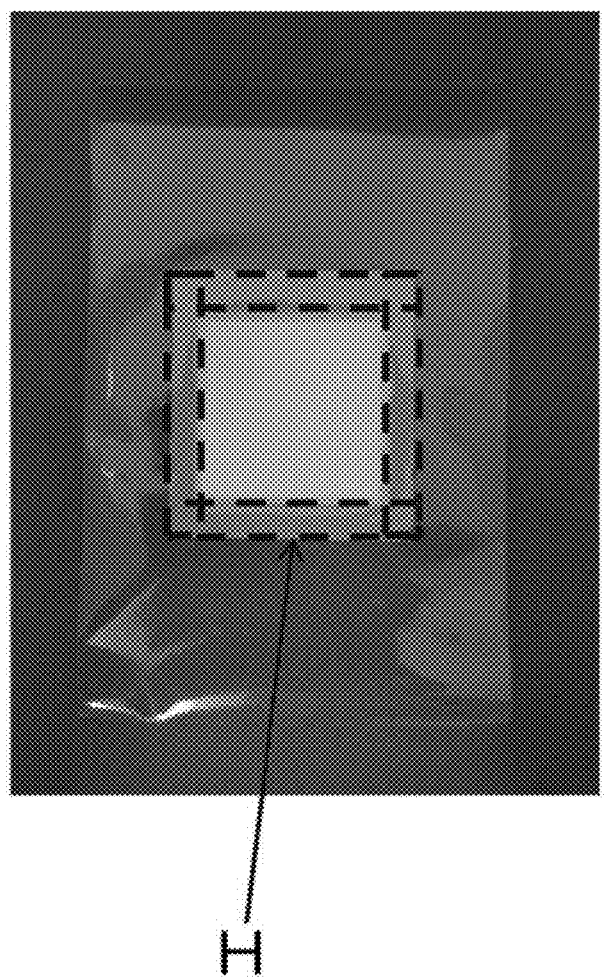
FIG. 14 is a photograph of the separator structure prepared in Example 2.

An alumina substrate-supported LDH membrane was prepared as a porous substrate-supported separator, as in the Example 1. As shown in FIGS. 13A and 13B, a separator 28 supported by a porous substrate 30 had a frame 32 of modified polyphenylene ether resin disposed along the outer periphery of the separator 28 (i.e. the LDH membrane). In this embodiment, the frame 32 had a square shape, and had a step in its inner periphery such that the outer periphery of the porous substrate 30 and the separator 28 was fitted in the step. A laminate film (thickness: 50 μm; materials: PP resin (base film) and PE resin (thermoplastic resin)) was placed on the frame 32 as a flexible film 34. The flexible film 34 had a central opening 34a formed in advance, and was disposed such that the opening 34a corresponds to the open area in the frame 32. The joint portions of the flexible film 34 with the frame 32 and of the frame 32 with the separator 28 supported by the porous substrate 30 were sealed by thermal bonding at about 200° C. with a heat sealer. A photograph of the resulting separator structure is shown in FIG. 14, where the region H defined by the dotted lines represents the area of sealing by thermal bonding such that the area is ensured to have liquid tightness. Five such separator structures 12 were prepared.

(2) Preparation of Positive-Electrode Plate

Particulate nickel hydroxide containing zinc and cobalt in the form of solid solution was prepared. The particulate nickel hydroxide was coated with cobalt hydroxide to yield a positive-electrode active material. The resulting positive-electrode active material was mixed with a 2% aqueous carboxymethyl cellulose solution to prepare a paste. The paste was evenly applied to a collector composed of a nickel porous substrate having a porosity of about 95% and was dried such that the porosity of the positive-electrode active material was 50%, to prepare a positive-electrode plate having a predetermined region coated with the active material.

(3) Preparation of Negative-Electrode Plate

A mixture of powdery zinc oxide (80 parts by weight), powdery zinc (20 parts by weight), and particulate polytetrafluoroethylene (3 parts by weight) was applied onto a collector composed of punched copper sheet, to prepare a negative-electrode plate having a porosity of about 50% and a predetermined region coated with the active material.

(4) Preparation of Laminated Nickel-Zinc Battery Cartridge

Figure 15:
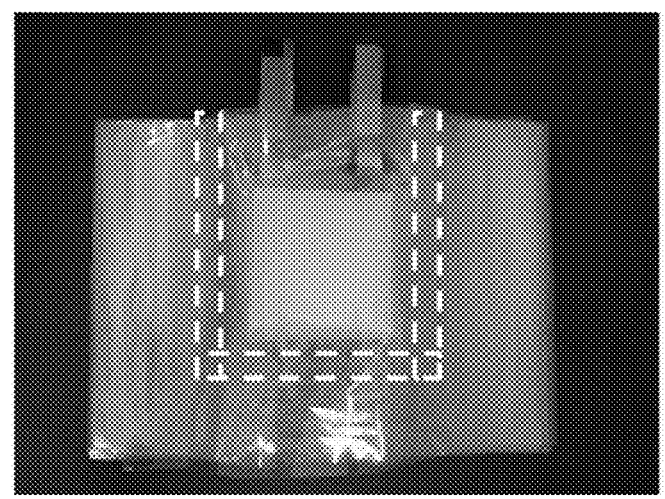
FIG. 15 is a photograph of the laminate prepared in Example 2 before thermal bonding.
Figure 16:
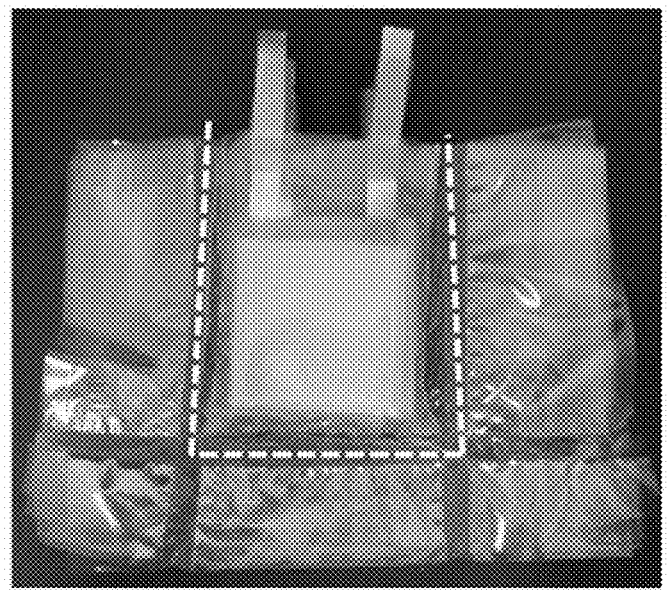
FIG. 16 is a photograph of the laminate prepared in Example 2 after thermal bonding.
Figure 17:
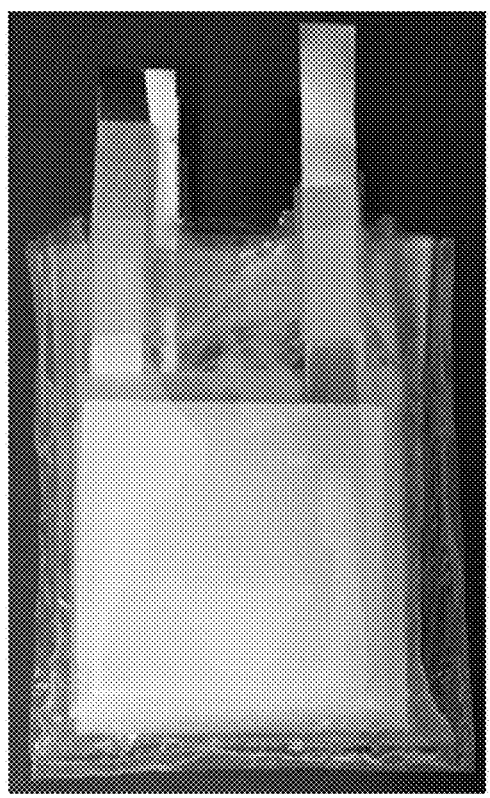
FIG. 17 is a photograph of a laminated nickel zinc battery cartridge produced in Example 2.

Five separator structures 12, three positive electrode plates and three negative electrode plates, which were prepared as above were assembled into a nickel-zinc battery cartridge in the following procedure. A pair of flexible laminate films (thickness: 50 μm, material: PP resin (base film) and PE resin (thermoplastic film)) was prepared (not shown). The three negative electrode plates, the five separator structures 12, and the three positive electrode plates are disposed on one of the flexible laminate films so that the negative electrode plate and the positive electrode plate are alternately positioned while the separator structure 12 is interposed therebetween. Finally the other flexible laminate film was disposed. In this case, the separator structure 12 was disposed such that the porous substrate 30 and the frame 32 were positioned adjacent to the positive electrode plate. FIG. 15 is a photograph of the resulting stacked structure. The overlapped portion of the flexible film (i.e., the portion to be the three outer edge portions) surrounded by the dotted line in FIG. 15 was thermally welded at about 200° C. with a heat sealer. FIG. 16 shows a photograph of a water impermeable case sealed by thermal bonding. The thermally-welded region in FIG. 16 is cut along the line indicated by the dotted line to prepare a water impermeable case having the three outer edges sealed by thermal bonding as shown in FIG. 17. As can be seen from FIG. 17, the upper end portion of the water impermeable case is open without being sealed by thermal bonding, and the positive-electrode collector and the negative-electrode collector extend from the outer edge of the flexible bag at different positions (corresponding to two pieces of metal seen in the drawing). Thus, a water impermeable case containing the five separator structures 12, the positive electrode plates and the negative electrode plates was placed in a vacuum desiccator. A 6 mol/L aqueous KOH electrolytic solution was then injected into each of the positive electrode chamber and the negative electrode chamber in the water impermeable case under a vacuum atmosphere. This electrolytic solution was injected from the open part of the upper end of the water impermeable case. FIG. 17 is a photograph of the laminated nickel-zinc battery cartridge prepared in such a manner.

Example 3

In this example, samples 1 to 10; i.e., samples of layered double hydroxide (LDH)-containing composite material (samples of separator with porous substrate) were prepared by formation of an LDH dense membrane on a porous substrate.

(1) Preparation of Porous Substrate

Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at 1,150° C. for three hours, to prepare an alumina porous substrate.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Spin-Coating with Polystyrene and Sulfonation

For samples 1 to 6, each porous substrate was spin-coated with polystyrene and sulfonated through the following procedure. Specifically, a polystyrene substrate (0.6 g) was dissolved in xylene (10 mL) to prepare a coating solution having a polystyrene concentration of 0.06 g/mL. The coating solution (0.1 mL) was added dropwise and applied to the porous substrate by a spin coating process at 8,000 rpm for 200 seconds (including dropwise addition and drying). The spin-coated porous substrate was sulfonated through immersion in 95% sulfuric acid at 25° C. for four days.

(4) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3$ ratio of 4. The resultant solution was further agitated to prepare an aqueous stock solution.

(5) Formation of Membrane by Hydrothermal Treatment

The aqueous stock solution prepared in the above procedure (4) and the porous substrate sulfonated in the above procedure (3) (for samples 1 to 6) or the porous substrate cleaned in the above procedure (2) (for samples 7 to 10) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70 to 75° C. for 168 to 504 hours, to form oriented layered double hydroxide membranes on the surfaces of the substrate. Ten types of oriented membranes with different densities were prepared under appropriately selected conditions for the hydrothermal treatment. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.0 to 2.0 μm. LDH-containing composite material samples (hereinafter referred to as "composite material samples") were thereby prepared (samples 1 to 10). LDH membranes were formed on the opposite surfaces of the porous substrate. In order to use the composite material as a separator, the LDH membrane on one surface of the porous substrate was mechanically removed.

(6a) Identification of Membrane Sample

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile was compared with the diffraction peaks of a layered double hydroxide (or a hydrotalcite compound) described in JCPDS card No. 35-0964 for identification of the membrane sample. Each of membrane samples 1 to 10 was identified as a layered double hydroxide (LDH, or a hydrotalcite compound).

(6b) Determination of He Permeability

Figure 18A:
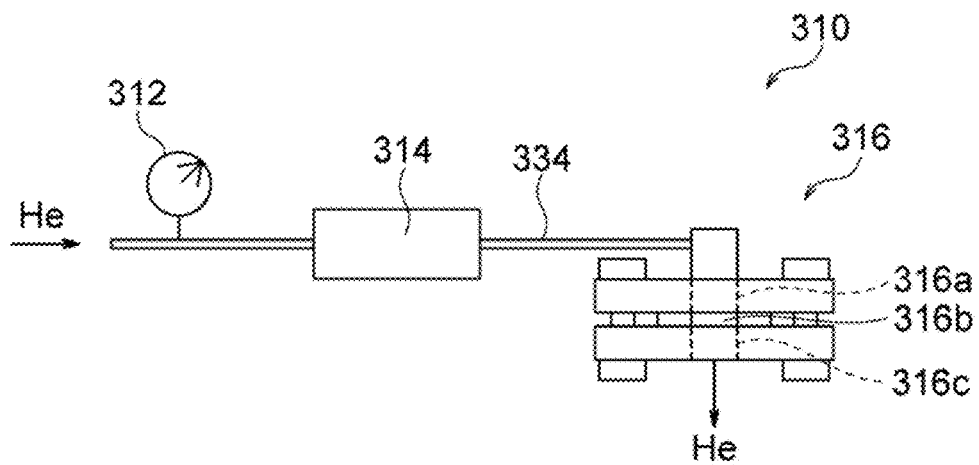
FIG. 18A is a schematic illustration of an exemplary system for determining He permeability.
Figure 18B:
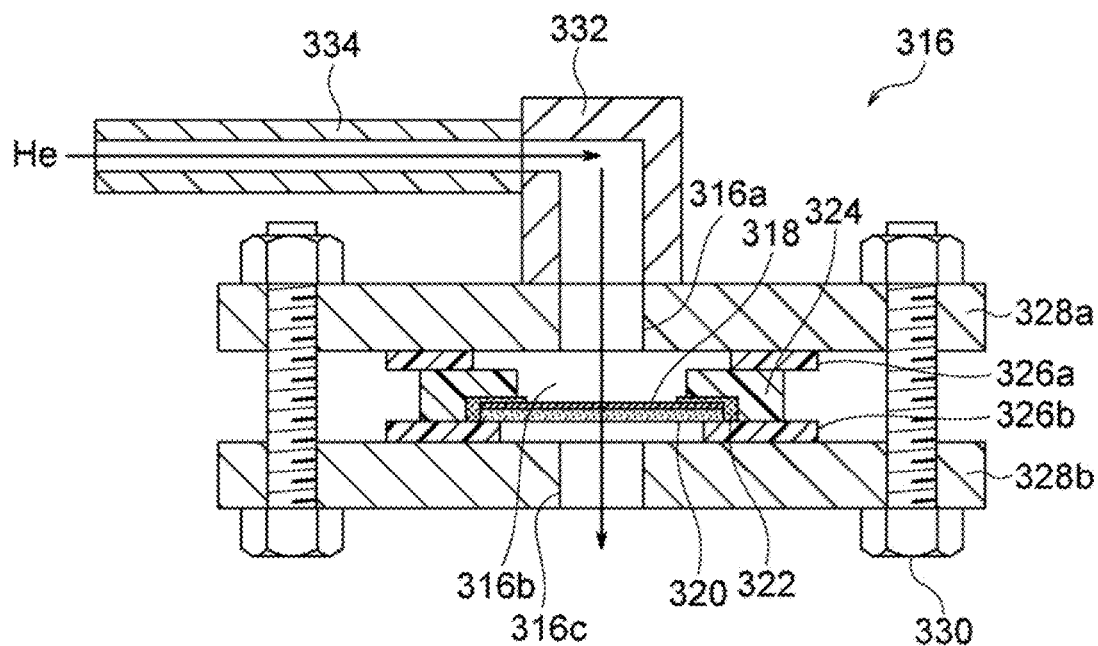
FIG. 18B is a schematic cross-sectional view of a sample holder used in the system illustrated in FIG. 18A and components provided around the sample holder.

The He permeabilities of membrane samples 1 to 10 were determined for evaluating the densities of these samples as follows. A He permeameter system 310 was provided as illustrated in FIGS. 18A and 18B. In the He permeameter system 310, He gas was fed from a He gas cylinder to a sample holder 316 through a pressure gauge 312 and a flowmeter 314 (digital flowmeter) and then fed to one surface of a dense membrane 318 held by the sample holder 316, so that the He gas permeated the dense membrane 318 end exited through the other surface.

The sample holder 316 including a gas inlet 316a, a hermetic space 316b, and a gas outlet 316c was assembled as follows. The dense membrane 318 was attached to a jig 324 (composed of ABS resin) having a central opening with an adhesive 322 applied to the periphery of the dense membrane 318. Sealing members (butyl rubber packings) 326a and 326b were respectively disposed on the upper and lower surfaces of the jig 324, and support members having openings (flanges) 328a and 328b composed of PTFE were respectively disposed on the sealing members 326a and 326b. Thus, the hermetic space 316b was defined by the dense membrane 318, the jig 324, the sealing member 326a, and the support member 328a. The dense membrane 318 was provided in the form of a composite material; i.e., the dense membrane 318 was disposed on the porous substrate 320 so as to face the gas inlet 316a. The support members 328a and 328b were fixed to each other with fasteners (screws) 330 so as to prevent leakage of He gas through sites other than the gas outlet 316c. A gas feeding tube 334 was connected to the gas inlet 316a of the sample holder 316 with a joint 332.

Subsequently, He gas was fed to the He permeameter system 310 through the gas feeding tube 334 so that the He gas permeated the dense membrane 318 held in the sample holder 316. The pressure and flow rate of the gas fed were monitored with the pressure gauge 312 and the flowmeter 314. The He permeability was calculated after the permeation of He gas for 1 to 30 minutes. The He permeability was calculated by the expression F/(P×S) where F represents the amount of He gas permeated per unit time ($cm^3$/min), P represents a differential pressure (atm) applied to the dense membrane during permeation of He gas, and S represents the membrane area ($cm^2$) through which He gas permeates. The amount F of He gas permeated ($cm^3$/min) was read directly from the flowmeter 314. The differential pressure P was a gauge pressure read from the pressure gauge 312. He gas was fed so as to achieve a differential pressure P of 0.05 to 0.90 atm. The results are shown in Table 1 and FIG. 20.

(6c) Determination of Zn Permeability

Figure 19A:
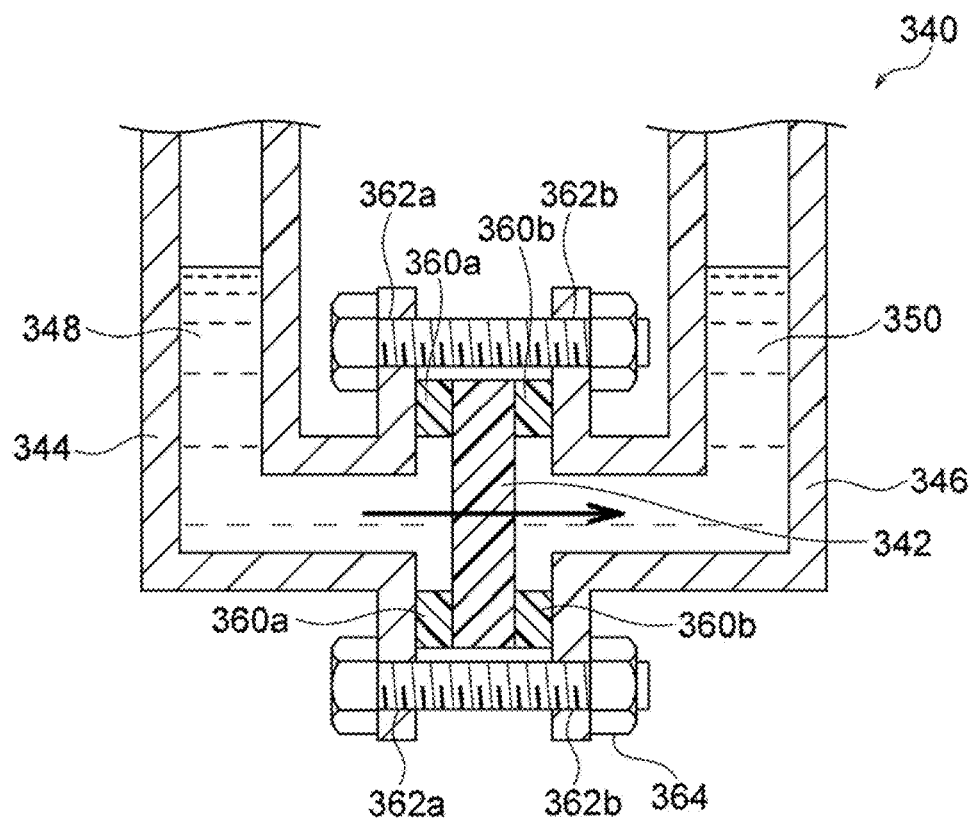
FIG. 19A is a schematic illustration of an exemplary device for determining Zn permeability.
Figure 19B:
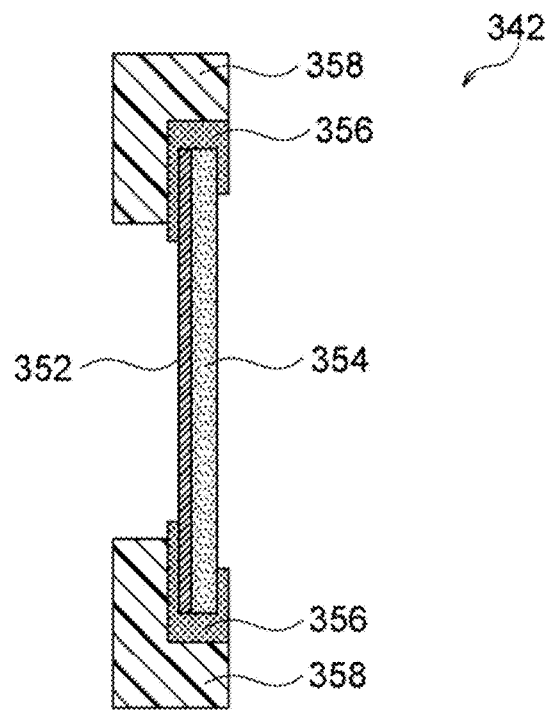
FIG. 19B is a schematic cross-sectional view of a sample holder used in the device illustrated in FIG. 19A.

The Zn permeabilities of membrane samples 1 to 10 were determined for evaluating the densities of these samples as follows. A Zn permeameter 340 was provided as illustrated in FIGS. 19A and 19B. In the Zn permeameter 340, a first vessel 344 composed of an L-shaped PTFE tube and combined with a flange 362a and a second vessel 346 composed of an L-shaped PTFE tube and combined with a flange 362b were disposed such that the flanges 362a and 362b faced each other. A sample holder 342 was disposed between the flanges 362a and 362b so that Zn might permeate the dense membrane held by the sample holder 342.

The sample holder 342 was assembled and attached to the permeameter 340 as follows. The dense membrane 352 was attached to a jig 358 (composed of ABS resin) having a central opening with an adhesive 356 applied to the periphery of the dense membrane 352. As illustrated in FIG. 19A, sealing members (e.g., silicone rubber packings) 360a and 360b were disposed on the opposite surfaces of the jig 358, and the paired flanges 362a and 362b were respectively disposed on the sealing members 360a and 360b. The dense membrane 352, which was provided on the porous substrate 354 (i.e., in the form of a composite material), was disposed so as to face the first vessel 344 (into which a first aqueous solution 348 containing Zn was to be injected). The flanges 362a and 362b were fastened to each other with fasteners (screws) 364 so as to prevent leakage of the liquid between the flanges 362a and 362b.

The first aqueous solution 348 for the first vessel 344 was a 9 mol/L aqueous KOH solution containing Al(OH)$_3$ (2.5 mol/L) and ZnO (0.5 mol/L). The Zn concentration $C_1$ (mol/L) of the first aqueous solution was measured by ICP atomic emission spectrometry. The results are shown in Table 1. The second aqueous solution 350 for the second vessel 346 was a 9 mol/L aqueous KOH solution containing Al(OH)$_3$ (2.5 mol/L) and not containing ZnO. In the permeameter 340 including the sample holder 342, the first aqueous solution 348 and the second aqueous solution 350 were respectively injected into the first vessel 344 and the second vessel 346 for permeation of Zn through the dense membrane 352 held by the sample holder 342. Thereafter, Zn was caused to permeate the dense membrane for a period of time t shown in Table 1. The volume $V_2$ (mL) of the second aqueous solution was then measured, and the Zn concentration $C_2$ (mol/L) of the second aqueous solution 350 was measured by ICP atomic emission spectrometry. The resultant data were used to calculate Zn permeability. The Zn permeability was calculated by the expression $(C_2 \times V_2)/(C_1 \times V_1 \times t \times S)$ where $C_1$ represents the Zn concentration (mol/L) of the first aqueous solution before the permeation of Zn, $V_1$ represents the volume (mL) of the first aqueous solution before the permeation of Zn, $C_2$ represents the Zn concentration (mol/L) of the second aqueous solution after the permeation of Zn, $V_2$ represents the volume (mL) of the second aqueous solution after the permeation of Zn, t represents the permeation time (min) of Zn, and S represents the membrane area (cm$^2$) through which Zn permeates. The results are shown in Table 1 and FIG. 20.

an electrode accommodated in the internal space of the water impermeable case, the electrode being a negative electrode comprising zinc and/or zinc oxide or a positive electrode.

2. The electrode cartridge according to claim 1, wherein the separator structure is provided with a frame along the outer peripheral edge of the separator, and the outer peripheral edge of the counter member and the separator structure are liquid-tightly bonded via the frame other than the upper end portion.

3. The electrode cartridge according to claim 1, wherein the counter member is a flexible film.

4. The electrode cartridge according to claim 3, wherein the flexible film comprises a resin film.

5. The electrode cartridge according to claim 1, wherein the counter member is a rigid plate.

6. The electrode cartridge according to claim 5, wherein the rigid plate comprises a resin plate.

7. The electrode cartridge according to claim 1, wherein the counter member comprises a separator structure comprising a separator exhibiting hydroxide ion conductivity and water impermeability.

8. The electrode cartridge according to claim 7, wherein both the separator structure not constituting the counter member and the separator structure constituting the counter member are each provided with a frame along the outer peripheral edge of the separator and wherein the frame constituting the counter member and the frame not constituting the counter member are liquid-tightly sealed.

TABLE 1

| | | Determination of He permeability | | | | Determination of Zn permeability | | | | |
|---|---|---|---|---|---|---|---|---|---|---|
| Sample No. | Sample Area of membrane S cm$^2$ | Differential pressure P atm | Amount of permeated He F cm$^3$/min | He permeability cm/min·atm | Time t h | Zn concentration of first aqueous solution before permeation of Zn $C_1$ mol/L | Volume of first aqueous solution before permeation of Zn $V_1$ mL | Zn concentration of second aqueous solution after permeation of Zn $C_2$ mol/L | Volume of second aqueous solution after permeation of Zn $V_2$ mL | Zn permeation m$^{-2}$·h$^{-1}$ |
| 1 | 1.52 | 0.16 | 0.03 | 0.1 | 24 | 0.35 | 6.5 | 0.00029 | 6.2 | 0.22 |
| 2 | 0.07 | 0.94 | 0.05 | 0.8 | 168 | 0.44 | 6.5 | 0.00041 | 4.6 | 0.58 |
| 3 | 1.77 | 0.16 | 0.17 | 0.6 | 24 | 0.35 | 6.8 | 0.0031 | 6.8 | 2.1 |
| 4 | 1.88 | 0.15 | 0.40 | 1.4 | 22 | 0.35 | 7.3 | 0.0046 | 7.3 | 3.2 |
| 5 | 1.57 | 0.16 | 0.77 | 3.1 | 22 | 0.43 | 6.9 | 0.0046 | 6.9 | 3.1 |
| 6 | 1.45 | 0.16 | 2.32 | 10 | 22 | 0.43 | 6.8 | 0.0046 | 6.9 | 3.4 |
| 7 | 1.63 | 0.15 | 4.08 | 17 | 24 | 0.35 | 7.2 | 0.047 | 5.0 | 24 |
| 8 | 1.71 | 0.17 | 12.2 | 42 | 23 | 0.42 | 7.0 | 0.076 | 5.2 | 34 |
| 9 | 1.86 | 0.16 | 26.5 | 89 | 23 | 0.42 | 7.3 | 0.070 | 6.9 | 37 |
| 10 | 1.95 | 0.17 | 84.6 | 260 | 26 | 0.42 | 6.8 | 0.090 | 6.5 | 40 |

What is claimed is:

1. An electrode cartridge for use in a hermetic zinc secondary battery comprising:
    a separator structure including a ceramic separator configured to exhibit hydroxide ion conductivity and water impermeability;
    a counter member liquid-tightly sealed to the separator structure so as to form an internal space and constituting an open-top water impermeable case together with the separator structure; and 9. The electrode cartridge according to claim 8, the frame is a resin frame.

10. The electrode cartridge according to claim 1, further comprising a porous sheet between the electrode and the separator.

11. The electrode cartridge according to claim 1, wherein the separator is a ceramic separator comprising an inorganic solid electrolyte.

12. The electrode cartridge according to claim 11, wherein the inorganic solid electrolyte comprises a layered double hydroxide having a fundamental composition represented by the following general formula:

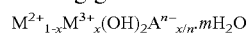

where $M^{2+}$ represents a divalent cation, $M^{3+}$ represents a trivalent cation, $A^{n-}$ represents an n-valent anion, n is an integer of 1 or more, x is 0.1 to 0.4, and m is 0 or more.

13. The electrode cartridge according to claim 11, wherein the separator structure further comprises at least one porous substrate on either or both of the surfaces of the ceramic separator, wherein the inorganic solid electrolyte is in a membrane or layer form and is disposed on or in the porous substrate.

14. The electrode cartridge according to claim 13, wherein the layered double hydroxide comprises an aggregation of platy particles, and the platy particles are oriented such that the tabular faces of the particles are perpendicular to or oblique to a surface of the porous substrate.

15. The electrode cartridge according to claim 1, wherein the separator has a He permeability per unit area of 10 cm/min·atm or less.

16. The electrode cartridge according to claim 1, wherein the separator has a Zn permeability per unit area of 10 $m^{-2} \cdot h^{-1}$ or less as determined by the contact of the separator with water.

17. The electrode cartridge according to claim 1, wherein the electrode cartridge further comprises a collector in contact with the electrode and extending beyond an upper end of the water impermeable case.

18. The electrode cartridge according to claim 1, wherein the electrode is the positive electrode, and the positive electrode comprises nickel hydroxide and/or nickel oxyhydroxide.

19. A zinc secondary battery comprising:
a hermetic container,
one or more electrode cartridges according to claim 1, being accommodated with the top open in the hermetic container;
a first electrolytic solution comprising an alkali metal hydroxide aqueous solution accommodated in the electrode cartridge, the electrode being disposed in the first electrolytic solution;
one or more counter electrodes facing the respective separator structures of the electrode cartridges, the counter electrodes being positive electrodes or negative electrodes comprising zinc and/or zinc oxide; and
a second electrolytic solution comprising an alkali metal hydroxide aqueous solution accommodated in the hermetic container, the counter electrode being disposed in the second electrolytic solution,
wherein the first electrolytic solution and the second electrolytic solution are isolated from each other so as not to be in fluid communication with each other via the electrode cartridge.

20. The zinc secondary battery according to claim 19, wherein a plurality of the electrode cartridges is provided, a plurality of the counter electrodes is provided, and the electrode cartridge and the counter electrode are alternately disposed.

21. The zinc secondary battery according to claim 19, further comprising a porous sheet between the counter electrode and the separator.

22. The zinc secondary battery according to claim 19, further comprising a counter collector being provided in contact with the counter electrode and extending beyond an upper end of the water impermeable case of the electrode cartridge.

23. The zinc secondary battery according to claim 19, wherein the positive electrode comprises nickel hydroxide and/or nickel oxyhydroxide, whereby the zinc secondary battery is a nickel zinc battery.

24. The zinc secondary battery according to claim 19, wherein the electrode in the electrode cartridge is the negative electrode and the counter electrode is the positive electrode.

* * * * *